United States Patent [19]

Hachiya et al.

[11] Patent Number: 4,877,858
[45] Date of Patent: Oct. 31, 1989

[54] LIQUID-CRYSTALLINE POLYMER

[75] Inventors: Satoshi Hachiya; Shunji Uchida; Kenji Hashimoto, all of Kimitsu, Japan

[73] Assignee: Idemetsu Kosan Co., Ltd., Tokyo, Japan

[21] Appl. No.: 272,010

[22] Filed: Nov. 16, 1988

Related U.S. Application Data

[63] Continuation-in-part of Ser. No. 136,868, Dec. 22, 1987, abandoned.

[30] Foreign Application Priority Data

Dec. 29, 1986 [JP] Japan ................. 61-309466
Nov. 17, 1987 [JP] Japan ................. 62-288475
Nov. 17, 1987 [JP] Japan ................. 62-288476

[51] Int. Cl.[4] .......................................... C08G 59/00
[52] U.S. Cl. .................................................. 528/100
[58] Field of Search ............... 528/100, 105, 421, 86, 528/362, 361; 252/299.01; 350/350 S

[56] References Cited

U.S. PATENT DOCUMENTS 4,728,458  3/1988  Higuchi et al. ............... 252/299.68
4,762,912  8/1988  Leslie et al. ................. 526/311

FOREIGN PATENT DOCUMENTS 0231770  8/1987  European Pat. Off. ....... 252/299.01

OTHER PUBLICATIONS

"Synthesis, Structure, & Properties of Crystalline Side Chain Polymers" Finkelmann, H. *Polymer Liquid Crystals* Academic Press, pp. 35–62, Dec. 1983.

*Primary Examiner*—Theodore Morris
*Attorney, Agent, or Firm*—Antonelli, Terry & Wands

[57] ABSTRACT

A liquid-crystalline polymer comprising the repeating units of the general formula (I)

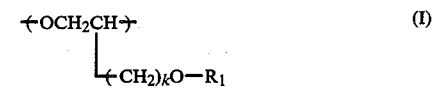

in which:
k is an integer from 1 to 30; and
$R^1$ is

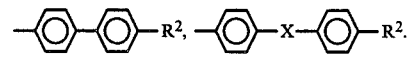

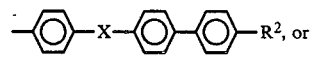

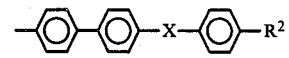

where:
X is —COO— or —OCO—; and
$R^2$ is —COOR$^3$, OCOR$^3$, or —OR$^3$
where:
$R^3$ is

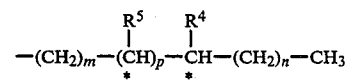

$R^4$ and $R^5$ being each independently —CH$_3$, a halogen radical, or —CN, m and n being each independently an integer from 0 to 10 with the proviso that n is not 0 when $R^4$ is —CH$_3$, p being 0 or 1, and C marked with * being an asymmetric carbon atom.

The polymers of the present invention exhibit a ferroelectricity even at temperatures around room temperature and as well such a high speed of response to external factors that they can be used for displaying motion pictures, and the polymers may also be advantageously used as display elements for large displays or curved displays.

23 Claims, 28 Drawing Sheets

LIQUID-CRYSTALLINE POLYMER

This application is a continuation in part of Ser. No. 07/136,868 filed 12/22/87, now abandoned.

BACKGROUND OF THE INVENTION (1) Industrial Field of the Invention

The present invention relates to novel liquid-crystalline polymers. More specifically, the present invention relates to liquid-crystalline polymers, which polymers exhibit a ferroelectricity even at temperatures around room temperature and have such a high speed of response to external factors that they can be used for displaying motion pictures, and can also be advantageously used as display elements for large displays or curved displays. Such liquid-crystalline polymers are useful in optoelectronics fields as various electronic optical devices, particularly, as display elements for desk calculators, clocks and watches, etc., electronic optical shutters, electronic optical diaphragms, optical modulators, optical-path transfer switches in optical communication systems, memories, liquid crystal printer heads, varifocal lenses, or the like.

(2) Description of the Related Art

Display elements for which low molecular weight liquid crystal compounds are employed have been widely used for digital display in desk calculators, clocks and watches, etc. In these fields of utilization, conventional low molecular weight liquid crystal compounds are used being sandwiched between a couple of glass substrates, the space between the glass substrates being controlled with an accuracy to an extent of micrometers. However, such an accurate adjustment of the space has actually been impossible for large displays or curved displays.

In order to solve the problem, it has been attempted to develop polymeric liquid crystals so that the liquid crystals per se can be molded (cf., J. Polym. Sci., Polym. Lett., Ed. 13, 243 (1975), Polym. Bull., 6, 309 (1982), Japanese Patent Laid-Open No. 21479/1980).

Nevertheless, the displays obtained from those liquid crystal polymers are still insufficient in practical use since the polymers generally exhibit slow response in the change of their transmission intensity to change of external factors such as electric field, etc.

Moreover, the liquid crystal polymers disclosed in the Japanese Patent Laid-Open described above have an disadvantage in that the polymers do not exhibit any liquid crystal properties unless they are heated at temperatures between their glass transition temperatures and their clearing points.

In 'Liquid Crystal, 2, 83 (1987)', there is reported synthesis of ferroelectric polymeric liquid crystals, but there is no disclosure concerning the response speed. The polymers are also colored and are therefore unsuitable for full-color display.

SUMMARY OF THE INVENTION

The object of the present invention is to provide liquid-crystalline polymers which are colorless, exhibit a ferroelectricity even at temperatures around room temperature and have such a high speed of response to external factors that they can display motion pictures, and may also be advantageously used as display elements for large displays or curved displays.

We found as the result of diligent studies that polyether-type polymers having specific structures are colorless and exhibit a ferroelectricity even at temperatures around room temperature, and we eventually completed the present invention.

According to the present invention, there are provided liquid-crystalline polymers comprising the repeating units of the general formula (I)

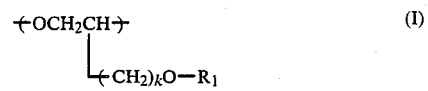

in which:
K is an integer from 1 to 30; and
$R^1$ is

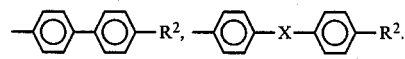

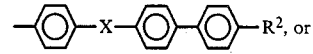

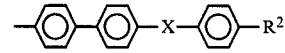

where:
X is —COO— or —OCO—; and
$R^2$ is —COOR$^3$, —OCOR$^3$, or —OR$^3$
where:
$R^3$ is

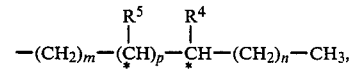

$R^4$ and $R^5$ being each independently —CH$_3$, a halogen radical, or —CN, m and n being each independently an integer from 0 to 10 with the proviso that n is not 0 when $R^4$ is —CH$_3$, p being 0 or 1, and C marked with * being an asymmetric carbon atom.

DETAILED DESCRIPTION OF THE INVENTION

Figure 1:
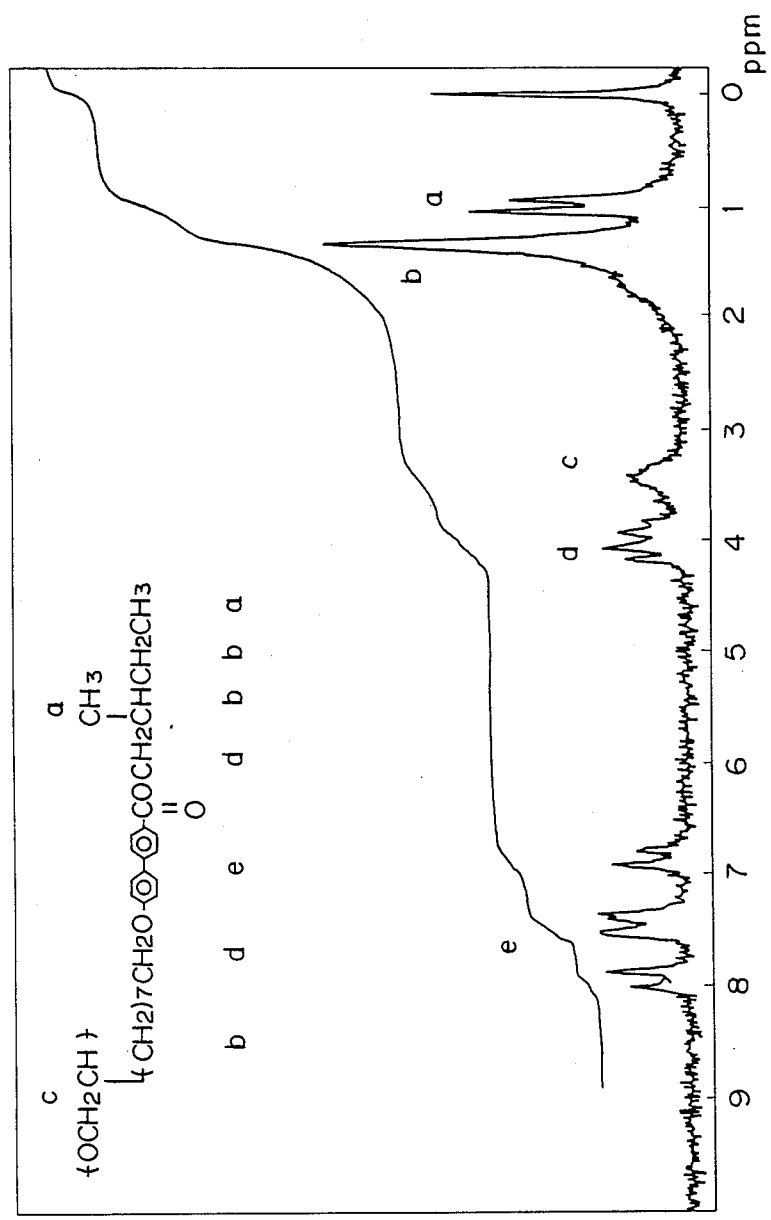
FIG. 1 is an $^1$H-NMR spectrum of the polymer obtained in Example 1.

The preferred liquid-crystalline polymers of the present invention are those having a number average molecular weight of 1,000 to 400,000. If the number average molecular weight is less than 1,000, the moldability of the polymers into films or coated films is occasionally deteriorated. If it is more than 400,000, there occasionally appear undesirable effects such as lowered response speed.

Among the liquid-crystalline polymers of the present invention, those having a number average molecular weight less than 2,000 and not less than 1,000 are little in decreases of response speed owing to polymerization. They also can be easily well oriented by applying them onto substrates equipped with electrodes in their liquid crystal states.

In the above general formula (I), k is preferably an integer of 4 to 10.

In the above general formula (I), $R^1$ is preferably

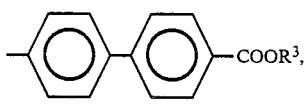—COOR$^3$,

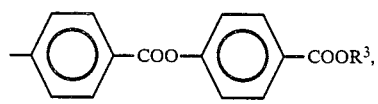—COOR$^3$,

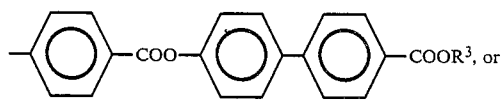—COOR$^3$, or

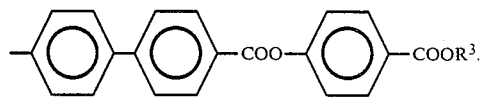—COO——COOR$^3$.

In the above general formula (I), $R^3$ is preferably

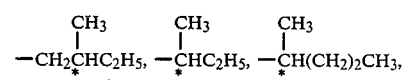

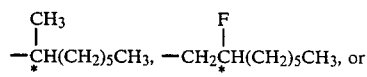

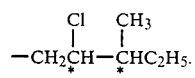

Hereinafter, general method of preparing the liquid-crystalline polymers of the present invention will be described.

The liquid-crystalline polymers of the present invention may be prepared by polymerizing the monomers represented by the following general formula

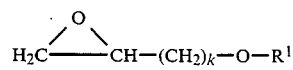

wherein k, X, $R^1$, $R^2$, $R^3$, $R^4$, $R^5$, m, n, and p are as defined above, by known methods.

These monomers, for example, may be prepared as follows.

(1) Preparation of monomers wherein $R^1$ is

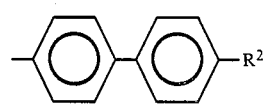

As shown in the following equation, an alkenol (II) is halogenized with a halogenation agent such as thionyl chloride in the presence of pyridine to obtain an alkene halide (III). The alkene halide (III) and a compound (IV) are reacted in the presence of an alkali such as potassium carbonate in a solvent such as 2-butanone to obtain an ether compound (V). The ether compound (V) is then converted into an oxirane with an peracid such as m-chloroperbenzoic acid in a solvent such as dichloromethane to obtain the objective monomers (VI).

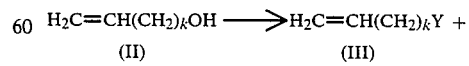

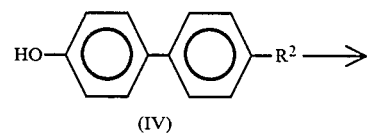

-continued

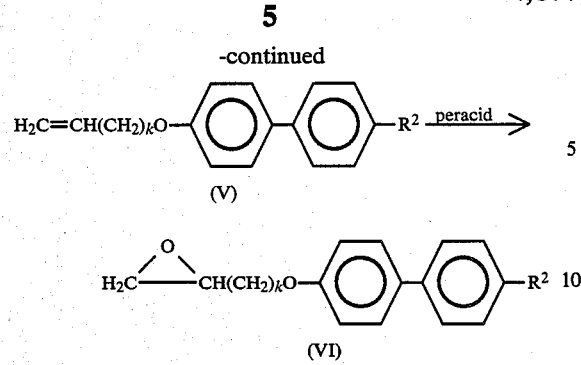

In the above equation, Y is a halogen radical.

The preferred alkenols (II) are, for example, 9-decene-1-ol, 11-dodecene-1-ol, 7-octene-1-ol, and 5-hexene-1-ol.

The above-mentioned compounds (IV)

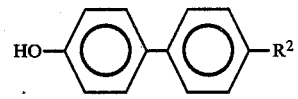

may be prepared as follows.

SYNTHESIS OF

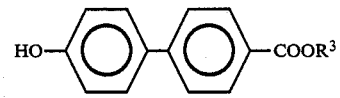

As shown in the following equation, the ester compounds (VIII) may be prepared by reacting 4′-hydroxybiphenyl-4-carboxylic acid with an optically active alcohol (VII) in a solvent such as benzene, in the presence of an esterification catalyst such as concentrated sulfuric acid, at a desired temperature.

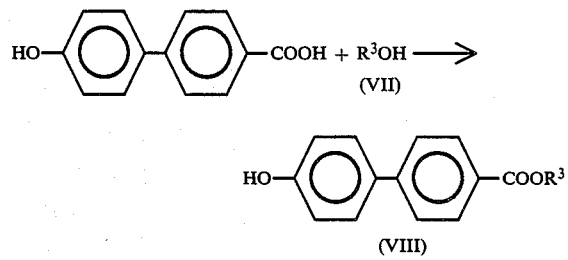

The illustrative examples of the optically active alcohols (VII) which may be used include (+)-2-methylbutanol, (−)-2-methylbutanol, (+)-2-chlorobutanol, (−)-2-chlorobutanol, (+)-2-methylpentanol, (−)-2-methylpentanol, (+)-3-methylpentanol, (−)-3-methylpentanol, (+)-4-methylhexanol, (−)-4-methylhexanol, (+)-2-chloropropanol, (−)-2-chloropropanol, (+)-6-methyloctanol, (−)-6-methyloctanol, (+)-2-cyanobutanol, (−)-2-cyanobutanol, (+)-2-butanol, (−)-2-butanol, (+)-2-pentanol, (−)-2-pentanol, (+)-2-octanol, (−)-2-octanol, (+)-2-fluorohexanol, (−)-2-fluorohexanol, (+)-2-fluorooctanol, (−)-2-fluorooctanol, (+)-2-fluorononanol, (−)-2fluorononanol, (+)-2-chloro-3-methylpentanol, and (−)-2-chloro-3-methylpentanol.

The preferred are (−)-2-methylbutanol, (+)-2-butanol, (−)-2-penthanol, (−)-2-octanol, (−)-2fluorooctanol, and (−)-2-chloro-3-methylpentanol.

SYNTHESIS OF

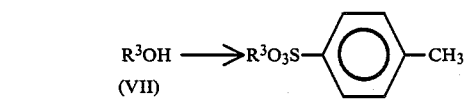

As shown in the following equation, the ester compounds (X) may be prepared by reacting biphenyl-4,4′-diol with an optically active carbolic acid (XI).

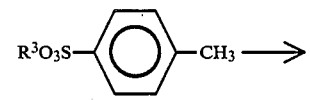

The illustrative examples of the optically active carboxylic acids (IX) which may be used include (+)-2-methylbutanoic acid, (−)-2-methylbutanoic acid, (+)-2-chlorobutanoic acid, (−)-2-chlorobutanoic acid, (+)-2-methylpentanoic acid, (−)-2-methylpentanoic acid, (+)-3-methylpentanoic acid, (−)-3-methylpentanoic acid, (+)-4-methylhexanoic acid, (−)-4-methylhexanoic acid, (+)-2-chloropropanoic acid, (−)-2-chloropropanoic acid, (+)-6-methyloctanoic acid, (−)-6-methyloctanoic acid, (+)-2-cyanobutanoic acid, (−)-2cyanobutanoic acid, (+)-2-fluorooctanoic acid, (−)-2-fluorooctanoic acid, (+)-2-chloro-3-methylpentanoic acid, and (−)-2chloro-3-methylpentanoic acid.

SYNTHESIS OF

As shown in the following equation, the ester compounds (XI) may be prepared by tosylating the above-described optically active alcohol (VII) and reacting the resulting tosylated compound with biphenyl-4,4′-diol.

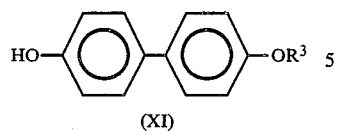

(XI)

(2) Prepartaion of monomers wherein $R^1$ is

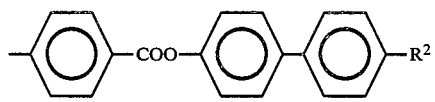

As shown in the following equation, an alkene halide (III) and ethyl p-hydroxybenzoate are reacted in a solvent such as acetone in the presence of an alkali such as potassium carbonate to obtain an ether compound. Subsequently, the radical protecting the carboxyl radical of the ether compound is eliminated with an aqueous sodium hydroxide solution, hydrochloric acid, or the like to convert it to a carboxylic acid compound. The resulting carboxylic acid compound is then converted to an acid halide by adding a halogenation agent such as thionyl chloride and heating in a solvent such as toluene. The acid halide is then reacted with the above-described compound (IV) in a solvent such as toluene in the presence of pyridine to obtain an ester compound (XII). The resulting ester compound (XII) is converted to an oxirane by the use of a peracid such as m-chloroperbenzoic acid and a solvent such as dichloromethane, and thus the objective monomers (XIII) are prepared.

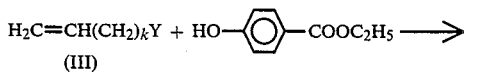

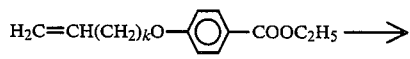

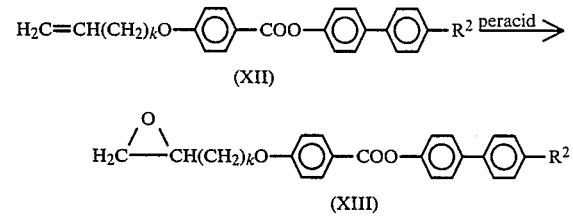

(3) Preparation of monomers wherein $R^1$ is

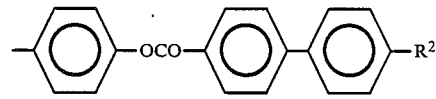

As shown in the following equation, an alkene halide (III) and hydroquinone are reacted in the presence of an alkali such as potassium carbonate to obtain an ether compound (XIV).

A compound (XV) is converted to an acid chloride with thionyl chloride or the like. The obtained acid chloride is reacted with the ether compound (XIV) in the presence of pyridine to obtain an ester compound (XVI). Thereafter, conversion to oxirane is carried out in the same way as (1) to obtain the objective monomers (XVII).

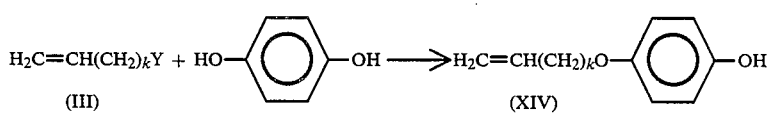

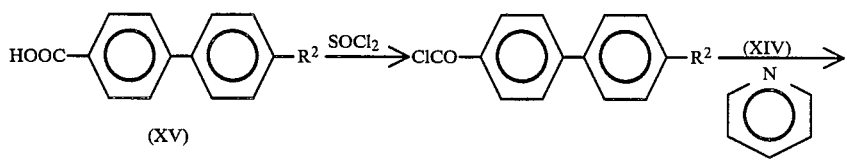

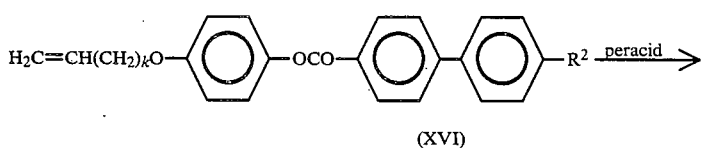

-continued

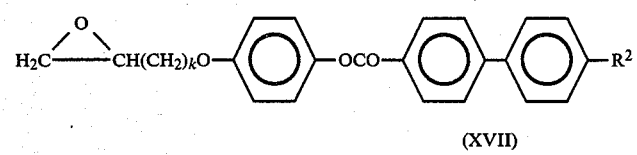

The compounds (XV)

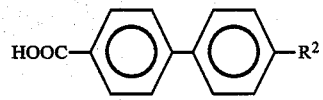

may be prepared as follows.

SYNTHESIS OF

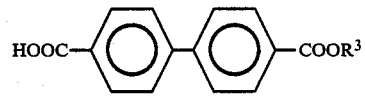

The ester compounds (XVIII) may be prepared by reacting an optically active alcohol (VII) with biphenyl-4,4'-dicarboxylic acid in a solvent such as toluene in the presence of an esterification catalyst.

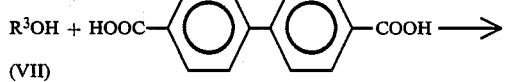

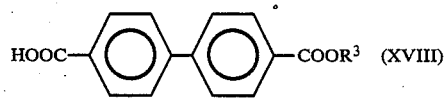

SYNTHESIS OF

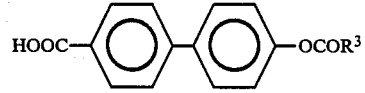

The ester compound (XIX) may be prepared by converting an optically active carboxylic acid (IX) with thionyl chloride or the like to an acid chloride and then reacting the obtained acid chloride with 4'-hydroxybiphenyl-4-carboxylic acid in the presence of pyridine.

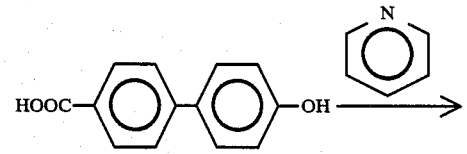

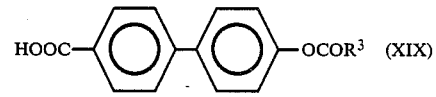

SYNTHESIS OF

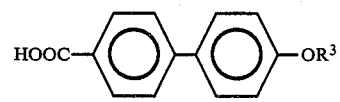

Ethyl 4'-hydroxybiphenyl-4-carboxylate is reacted with a compound having the structure,

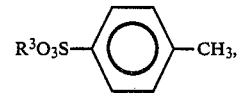

which is prepared by tosylating an optically active alcohol (VII), in the presence of potassium carbonate to obtain an ether compound. The ether compound is reacted with an aqueous alkali solution to eliminate the protective radical by hydrolysis, and thus the objective compounds (XX) are obtained.

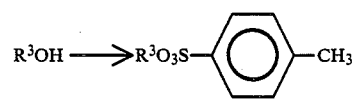

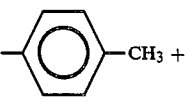

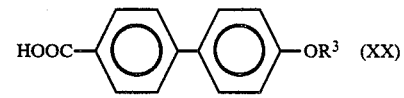

(4) Preparation of monomers wherein $R^1$ is

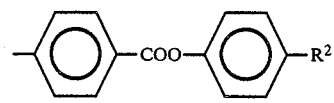

The objective monomers (XXII) may be prepared by the use of the procedure of (2) preparation of monomers werein $R^1$ is

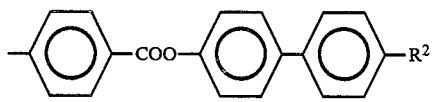

with the exception that a compound (XXI)

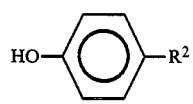

is used in place of the compounds (V)

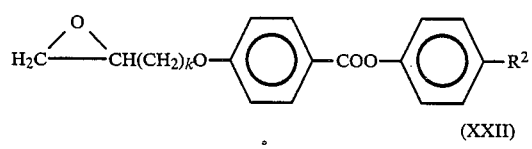

(XXII)

The compounds (XXI) may be prepared as follows.

SYNTHESIS OF

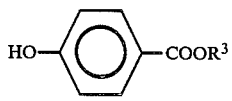

The ester compounds (XXIII) may be prepared by the procedure of synthesis of the compounds (VIII) in (1) with the exception that p-hydroxybenzoic acid is used in place of 4'-hydroxybiphenyl-4-carboxylic acid.

SYNTHESIS OF

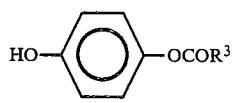

The ester compounds (XXIV) may be prepared by the procedure of synthesis of the compounds (IX) in (1) with the exception that hydroquinone is used in place of biphenyl-4,4'-diol.

SYNTHESIS OF

the ether compounds (XXV) may be prepared by the procedure of synthesis of the compounds (XI) in (1) with the exception that hydroquinone is used in place of biphenyl-4,4'-diol.

(5) Preparation of monomers wherein $R^1$ is

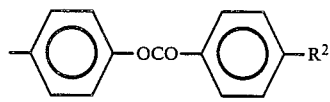

As shown in the following equation, the objective monomers (XXVII) may be prepared by the use of the procedure of (3) preparation of monomers wherein $R^1$ is

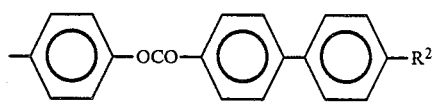

with the exception that a compound (XXVI)

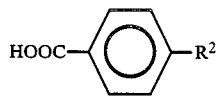

is used in place of the compounds (XV)

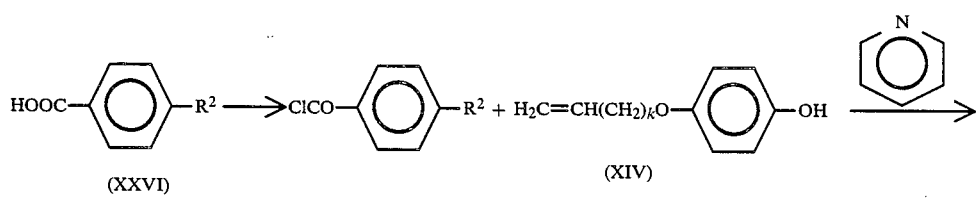

(XXVI)     (XIV)

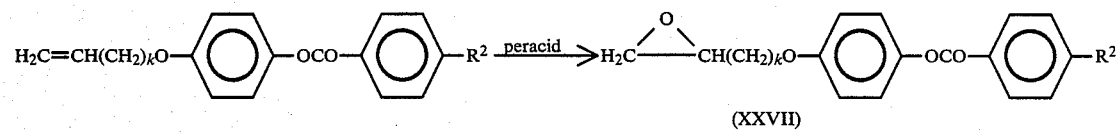

The compounds (XXVI) may be prepared as follows.

SYNTHESIS OF

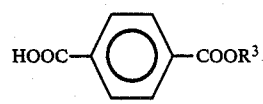

The ester compounds (XXVIII) may be prepared by the procedure of synthesis of the compounds (XVIII) in (3) with the exception that terephthalic acid is used in place of biphenyl-4,4'-dicarboxylic acid.

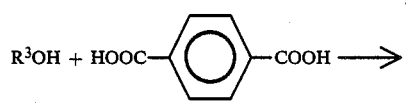

(XXVIII)

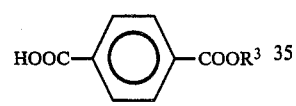

SYNTHESIS OF

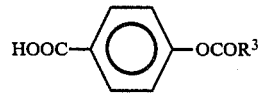

The ester compounds (XXIX) may be prepared by the procedure of synthesis of the compounds (XIX) in (3) with the exception that p-hydroxybenzoic acid is used in place of 4'-hydroxybiphenyl-4-carboxylic acid.

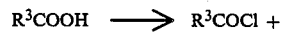

(IX)

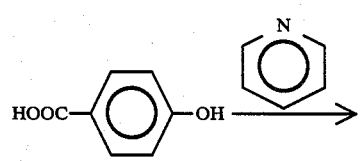

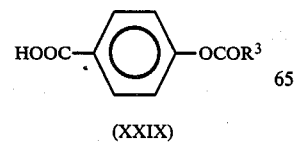

(XXIX)

SYNTHESIS OF

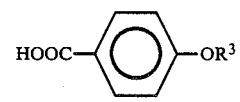

The ether compounds (XXX) may be prepared by the procedure of synthesis of the compounds (XV) in (3) with the exception that ethyl p-hydroxybenzoate is used in place of ethyl 4'-hydroxybiphenyl-4-carboxylate.

(XXX)

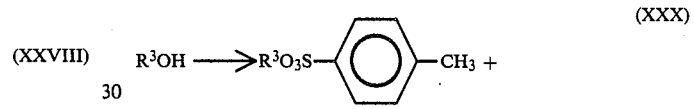

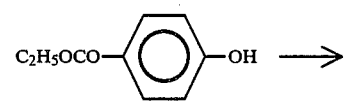

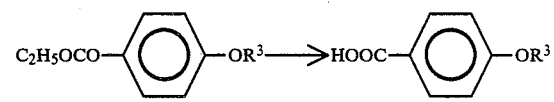

(6) Preparation of monomers wherein $R^1$ is

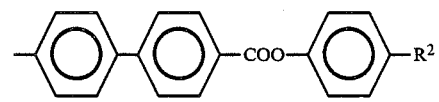

The objective monomers (XXXI) may be prepared by the use of procedure of (2) preparation of monomers wherein $R^1$ is

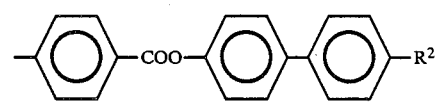

with the exception that ethyl 4'-hydroxybiphenyl-4-carboxylate is used in place of ethyl p-hydroxybenzoate, and a compound (XXI)

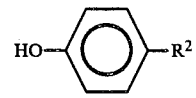

is used in place of the compounds (IV)

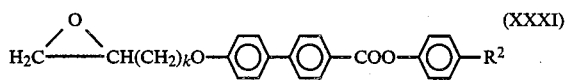

(7) Preparation of monomers wherein $R^1$ is

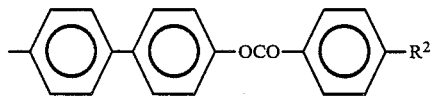

The objective monomers (XXXII) may be prepared by procedure of (3) preparation of monomers wherein $R^1$ is

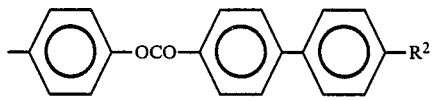

with the exception that biphenyl-4,4'- diol is used in place of hydroquinone, and a compound (XXVI)

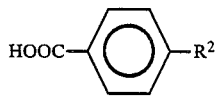

is used in place of the compounds (XV)

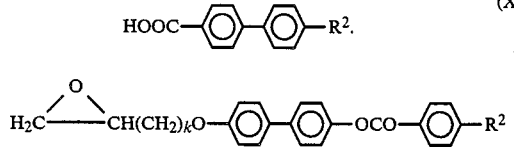

The liquid-crystalline polymers of the present invention are prepared by polymerizing one or more of the monomers thus obtained, and any known method of polymerization such as cationic polymerization may be employed.

The catalysts that can be employed for the cationic polymerization in the present invention are known ones including protonic acids such as sulfuric acid, phosphoric acid, or perchloric acid, Lewis acids such as boron trifluoride, aluminium chloride, titanium tetrachloride, or stannic chloride, boron trifluoride etherate, etc. Among these catalysts, stannic chloride may be suitably used.

It is also possible that the polymers are prepared by coordination polymerization by using organic aluminium complexes, etc. as a catalyst. In this case, the polymers having a number average molecular weight of not less than 30,000 can be obtained.

The polymerization techniques that can be employed in the present invention are slurry polymerization technique, solution polymerization technique, etc., preferably solution polymerization technique.

In case of preparing the polymers of the present invention having a number average molecular weight not less then 2,000, bulk polymerization technique can also be employed besides the above-described polymerization techniques.

Suitable polymerization temperature can be usually from 0° to 30° C., although it is not uniformly specified since it varies depending on the kind of the catalyst.

Suitable polymerization time can be usually from one to six days, although it varies depending on other polymerization conditions including the polymerization temperature, etc.

The control of the molecular weight of the polymers can be conducted by addition of a known molecular weight controlling agent and/or control of the concentration of catalyst to monomers. In case of preparing polymers having a number average molecular weight less than 2,000 and not less than 1,000 using stannic chloride catalyst, the suitable concentration of the catalyst to monomer is 5 to 10 mol %.

When bulk polymerization technique is employed, the polymers may be directly fixed between a couple of substrates in a state adhering to the substrates by sufficiently mixing one or more monomers with an initiator, sufficiently de-aerating the mixture, introducing the mixture between two substrates such as glass substrates, and heating.

The solvents to be used in slurry polymerization and solution polymerization may be any known inert solvent. The illustrative example of the solvents to be suitably used include hexane, dichloromethane, or aromatic solvents such as benzene, toulene, and xylene.

It is preferable to replace the atmosphere of the reaction system with an inert gas such as argon or nitrogen at the time of polymerization and conversion reaction to oxiranes.

Among the liquid-crystalline polymers of the present invention. the ploymers having a number average molecular weight not less than 2,000 may be used not only by the above-mentioned way of application but also as films by forming them by known film forming techniques such as casting technique, T-dye technique, inflation technique, calendar technique, orientation technique, or the like. Thus obtained films of the polymers of the present invention are useful in various optoelectronics fields such as liquid crystal displays, electronic optical shutters, electronic optical diaphragms, and the like by disposing them between a couple of large glass substrates, curved glass substrates, polyester films, etc., not to mention two usual glass substrates. Further, the polymers may also be directly formed into films adhering to a substrate by dissolving a polymer in a suitable solvent, applying the resulting polymer solution to a surface of a substrate such as glass substrate, and then evaporating the solvent.

Among the liquid-crystalline polymers of the present invention, the polymers having a number average molecular weight less than 2,000 and not less than 1,000 may be used in the above-mentioned various optoelectronics fields by disposing them between a couple of large glass substrates, curved glass substrates, polyester films, or the like, not to mention two usual glass substrates. Further, the polymers can be easily well oriented by applying them in their liquid crystal state onto substrates equipped with electrodes. Also, they may be directly formed into films adhering onto substrates by dissolving a polymer in a suitable solvent, applying the resulting polymer solution to a surface of a substrate such as glass substrate, and then evaporating the solvent.

By the measurement of phase transition temperature, it was confirmed that the liquid-crystalline polymers of the present invention assume chiral smectic C phase liquid crystal state at wide temperature range including temperatures around room temperature. It was also confirmed that they have a high speed of response at temperatures around room temperature.

The polymers of the present invention have both of the properties of smectic phase liquid crystal state and the typical property of polymers, excellent moldability, and they therefore have large possibility of usage in the fields of integrated optics, optoelectronics, and information memory. The polymers of the present invention, for example, may be used as various electronic optical devices for example liquid crystal displays such as digital displays of various forms, electronic optical shutters, optical-path transfer switches in optical communication systems, electronic optical diaphragms, memory devices, optical modulators, liquid crystal optical printer heads, varifocal lenses, and the like.

The polymers of the present invention may be further improved by various treatments well known in this industry, for example, mixing with other polymers of the present invention, mixing with other polymers, addition of additives such as various inorganic or organic compounds or metals including stablizers, plasticizers, etc.

In order to fully and clearly illustrate the present invention, the following examples are presented. It is intended that the examples be considered as illustrative rather than limiting the invention disclosed and claimed herein.

EXAMPLES 1 to 28

The structure of the polymers obtained in the Examples were identified by NMR, IR, and elementary analysis. The measurements of phase transition temperatures and identification of the phases were each conducted by the use of a DSC and a polarization microscope, respectively. (glass: glass state, Cry: crystal state, $S^1$: an unidentified smectic phase (a liquid crystal state having an order higher than that of chiral smectic C phase), SmC*: chiral smectic C phase, SmA: smectic A phase, N: nematic phase, N*: chiral nematic phase, Iso: isotropic phase). The numerals in phase transition behavior schemes represent the phase transition temperatures in °C. unit.

The measurments of the electric field response speed and spontaneous polarization intensity were conducted as follows.

MEASUREMENT OF ELECTRIC FIELD RESPONSE SPEED

A liquid-crystalline polymer was sandwiched between two ITO substrates (20×10 mm) and adjusted to 25 μm thick with a spacer, and an electric field $E = 2 \times 10^6$ V/m was then applied, and the time of response for the changes of the transmission intensity (0→90%) was measured.

MEASUREMENT OF SPONTANEOUS POLARIZATION INTENSITY

A liquid-crystalline polymer was sandwiched between two ITO substrates each having a transparent electrode portion of 0.2 cm² in area and was adjusted to 10 μm thick with a spacer. A triangular voltage having a crest value of 200 V was applied thereto, and the spontaneous polarization intensity was calculated from the signal of polarization inversion current.

EXAMPLE 1

1.(1) Synthesis of 2-methylbutyl 4′-hydroxybiphenyl-4-carboxylate 93 m mol (20 g) of 4′-hydroxybiphenyl-4-carboxylic acid and 467 m mol (41 g) of (S)-(−)-2-methylbutanol were refluxed for 25 hours in 150 ml of benzene in the presence of 2 ml of Conc. sulfuric acid while removing water. The resulting reaction solution was concentrated and was recrystallized from a toluene-hexane solvent mixture to obtain 26.0 g of the objective ester (m.p. 116–117.8° C., $[\alpha]D^{23} = +4.35°$ (CHCl$_3$)). (Yield: 98%).

1.(2) Synthesis of 10-chloro-1-decene 10 drops of pyridine was added to 26.0 g of 9-decene-1-ol and the mixture was placed in an eggplant type flask. Into the flask was then dropped 24.0 g of thionyl chloride while cooling with ice. After dropping thionyl chloride, reaction was carried out for 8.5 hours at 70° C. After the reaction, the resulting reaction solution was diluted with dichloromethane and was washed with an aqueous potassium hydroxide solution. The organic phase was dried over magnesium sulfate and was then concentrated under reduced pressure. The resulting residue was purified by column chromatography to obtain 27.7 g of 10-chloro-1-decene. (Yield: 95%).

1.(3) Synthesis of 2-methylbutyl 4′-(9-deceneyloxy)-biphenyl-4-carboxylate 2.5 g of 10-chloro-1-decene obtained in 1.(2) and 6.5 g of sodium iodide were dissolved in 2-butanone and the resulting solution was stirred for 17 hours at 80° C. After the reaction, the resulting reaction solution was diluted with dichloromethane and washed with water. The organic phase was dried over magnesium sulfate, and the solvent was then distilled out under reduced pressure. To the resulting residue were added 4.8 g of 2-methylbutyl 4′-hydroxybiphenyl-4-carboxylate and 2.4 g of potassium carbonate, and the resulting mixture was reacted an 2- butanone for 20 hours at 80° C. After the reaction, the inorganic substance was filtered out, and the filtrate was concentrated under reduced pressure and was then purified by column chromatography to obtain 4.6 g of the objective biphenyl derivative. (Yield: 76%).

1.(4) Conversion to oxirane 3.0 g of the biphenyl derivative obtained in 1.(3) and 1.5 g of m-chloroperbenzoic acid were dissolved in dichloromethane. After the atmosphere of the system was replaced with argon gas, the solution was then stirred for a day at room temperature. After the reaction, the resulting reaction mixture was washed with an aqueous potassium carbonate solution and further with water. The organic phase was dried over magnesium sulfate, and the solvent was then distilled out under reduced pressure to obtain 3.0 g of the objective monomer having the structure represented by the following formula. (Yield: 97%).

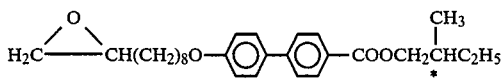

1.(5) Polymerization 0.5 g of the monomer obtained in 1.(4) was dissolved in 5 ml of dichloromethane, and the atmosphere of the system was replaced with argon gas. To the resulting solution was added 0.015 g of stannic chloride and polymerization reaction was carried out for 6 days at room temperature. After the reaction, the resulting reaction solution was poured into methanol. The resulting precipitate was purified by repeating reprecipitation to obtain 0.4 g of the objective polyoxirane (Mn=2,800) comprising the repeating units represented by the following formula. (Yield: 80%).

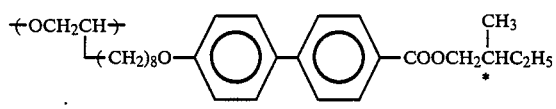

The number average molecular weight, phase transition behavior, electric field response speed, and spontaneous polarization intensity of the obtained polymer are shown in Table 1, and the $^1$H-NMR spectrum is shown in FIG. 1.

2. (1) Synthesis of 12-chloro-1-dodecene

The procedure of Example 1.(2) was repeated with the exception that 6.0 g of 11-dodecene-1-ol was used in place of 9-decene-1-ol to obtain 5.2 g of 12-chloro-1-dodecene. (Yield: 79%).

2. (2) Synthesis of 2-methylbutyl 4'-(11-dodceneyloxy)-biphenyl-4-carboxylate The procedure of Example 1.(3) was repeated with the exception that 5.2 g of 12-chloro-1-dodecene was used in place of 10-chloro-1-docene to obtain 8.8 g of the objective biphenyl derivative. (Yield: 76%).

2. (3) Conversion to oxirane

The procedure of Example 1.(4) was repeated using 8.8 g of the biphenyl derivative obtained in 2.(2) to obtain 8.8 g of a monomer having the structure represented by the following formula. (Yield: 95%).

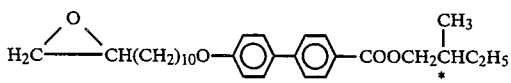

2. (4) Polymerization 2.3 g of the monomer obtained in 2.(3) was polymerized by the procedure of Example 1.(5) to obtain 1.5 g of the objective polyoxirane (Mn=3,200) comprising the repeating units represented by the following formula. (Yield: 65%).

Figure 2:
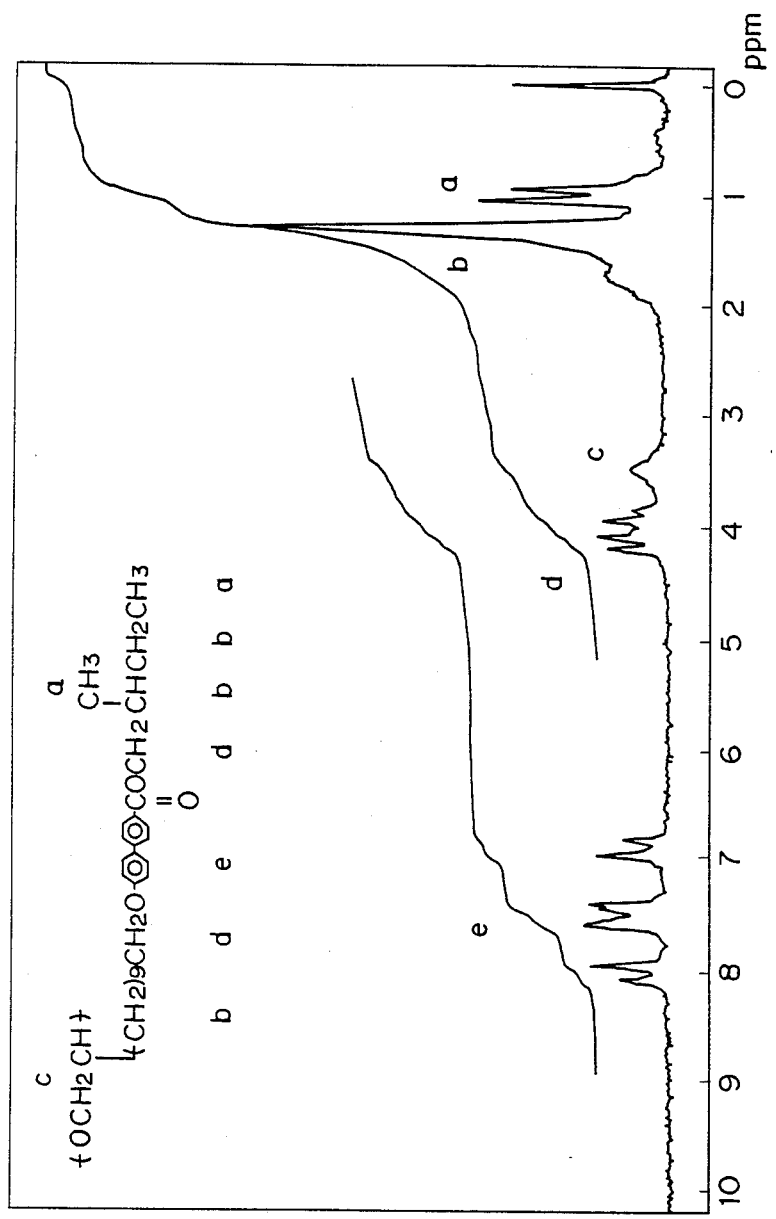
FIG. 2 is an $^1$H-NMR spectrum of the polymer obtained in Example 2.

The number average molecular weight, phase transition behavior, electric field response speed, and spontaneous polarization intensity of the obtained polymer are shown in Table 1, and the $^1$H-NMR spectrum is shown in FIG. 2.

EXAMPLE 3

2.(1) Synthesis of 2-methylbutyl 4'-(7-octenyloxy)-biphenyl-4-carboxylate 5.0 g of 8-bromo-1-octene, 8.2 g of 2-methylbutyl 4'-hydroxybiphenyl-4-carboxylate obtained in Example 1.(1), and 4.0 g pf potassium carbonate were refluxed in acetone for 20 hours. After the reaction the resulting reaction mixture was diluted with dichloromethane, and the inorganic substance was filtered out. Subsequently, the solvent was distilled out under reduced pressure, and the resulting residue was purified by column chromatography to obtain 7.5 g of the objective biphenyl derivative. (Yield : 73%).

3.(2) Conversion to oxirane

The procedure of Example 1.(4) was repeated using 7.4 g of the biphenyl derivative obtained in 3.(1) to obtain 7.6 g of a monomer having the structure represented by the following formula. (Yield: 99%).

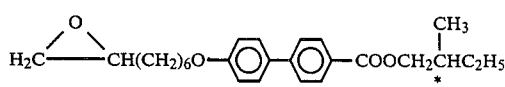

3.(3) Polymerization 2.05 g of the monomer obtained in 3.(2) was polymerized by the procedure of Example 1.(5) to obtain 1.4 g of the objective polyoxirane (Mn=3,300) comprising the repeating units represented by the following formula. (Yield: 68%).

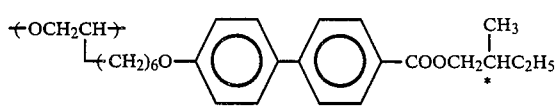

Figure 3:
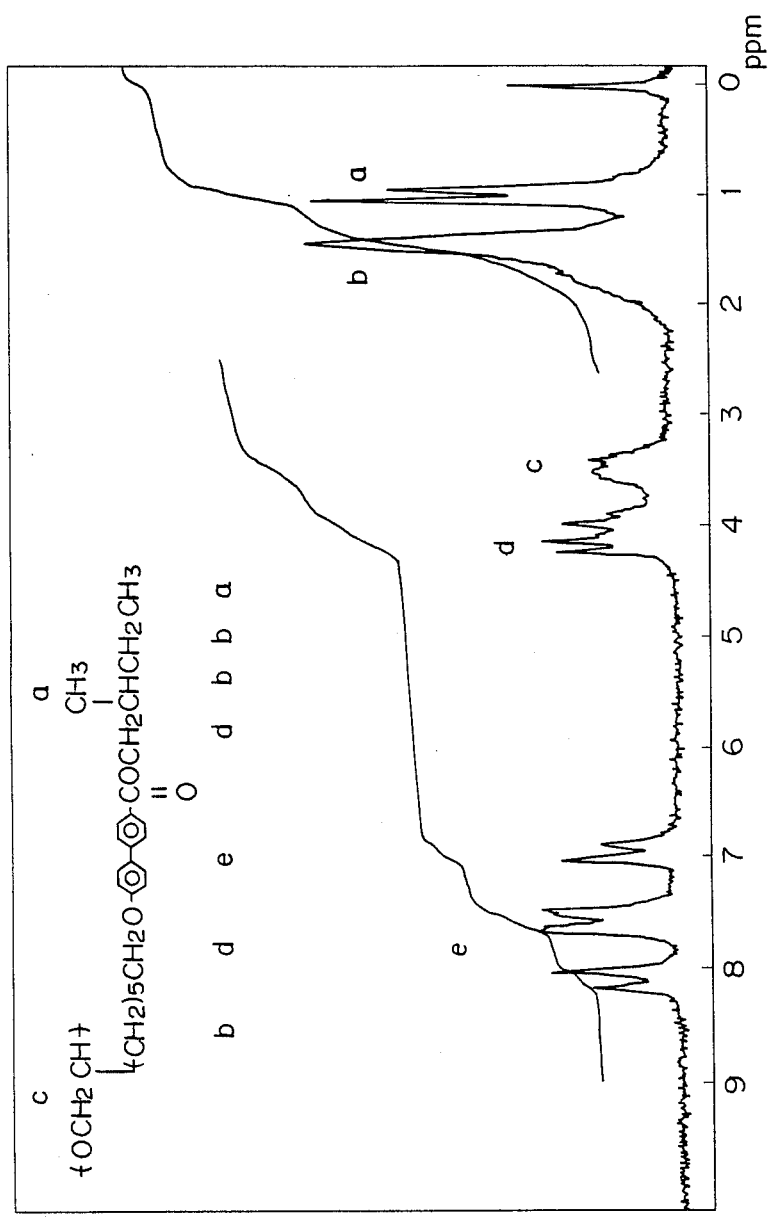
FIG. 3 is an $^1$H-NMR spectrum of the polymer obtained in Example 3.

The number average molecular weight, phase transition behavior, electric field response speed, and spontaneous polorarization intensity of the obtained polymer are shown in Table 1, and the $^1$H-NMR spectrum is shown in FIG. 3.

EXAMPLE 4

4.(1) Synthesis of p-(9-decenyloxy) benzoic acid 10.0 g of 10-chloro-1-decene obtained in Example 1.(2) was iodized by reacting it with 25 g of sodium iodide in 2-butanone for 10 hours at 80° C. The resulting reaction mixture was then washed with water and dried, and the solvent was then removed. To the obtained iodide product were added 11.5 g of ethyl p-hydroxybenzoate and 9.6 g of potassium carbonate, and the mixture was refluxed in absolute ethanol for 15 hours. To the resulting reaction mixture was then added an aqueous potassium hydroxide solution containing 4.0 g of potassium hydroxide, and the mixture was further heated at 80° C. for 5 hours. After the reaction, the resulting reaction solution was made acid with hydrochloric acid and concentrated under reduced pressure. The resulting residue was suspended in water, and the insoluble material was corrected and dried to obtain 9.5 g of p-(9-decenyloxy)benozic acid. (Yield: 60%).

4.(2) Synthesis of 2-methylbutyl 4'-[p-(9-decenyloxy)-benzoyloxy]biphenyl-4-carboxylate 9.5 g of p-(9-decenyloxy)benzoic acid obtained in 4.(1) was added toluene and the mixture was cooled with ice. To the mixture was dropped 5.0 g of thionyl chloride, and reaction was carried out for 7 hours at 80° C. After the reaction, the resulting reaction solution was concentrated under reduced pressure to obtain crude p-(9-decenyloxy) benzoyl chloride. 12.0 g of 2-methylbutyl 4'-hydroxybiphenyl-4-carboxylate and 3.3 g of pyridine were dissolved in tuolene and the resulting solution was cooled with ice. Subsequently, a toluene solution of the above-obtained crude p-(9-decenyloxy)-benzoyl chloride was dropped thereto. Reaction was carried out for 5 hours at 50° C. After the reaction, the resulting reaction mixture was washed with water and dried over magnesium sulfate, and the solvent was then distilled out under reduced pressure. The resulting residue was purified by column chromatography to obtain 9.3 g of the objective ester compound. (Yield: 50%).

4.(3) Conversion to oxirane

The procedure of Example 1.(4) was repeated using 9.0 g of the ester compound obtained in 4.(2) to obtain 8.5 g of a monomer having the structure represented by the following formula. (Yield: 92%).

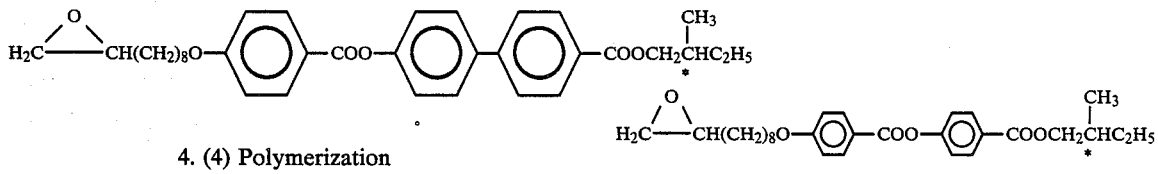

4. (4) Polymerization 5.6 g of the monomer obtained in 4.(3) was polymerized by the procedure of Example 1.(5) to obtain 3.1 g of the objective polyoxirane (Mn =4,100) comprising the repeating units represented by the following formula. (Yield: 55%).

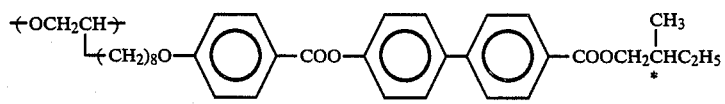

Figure 4:
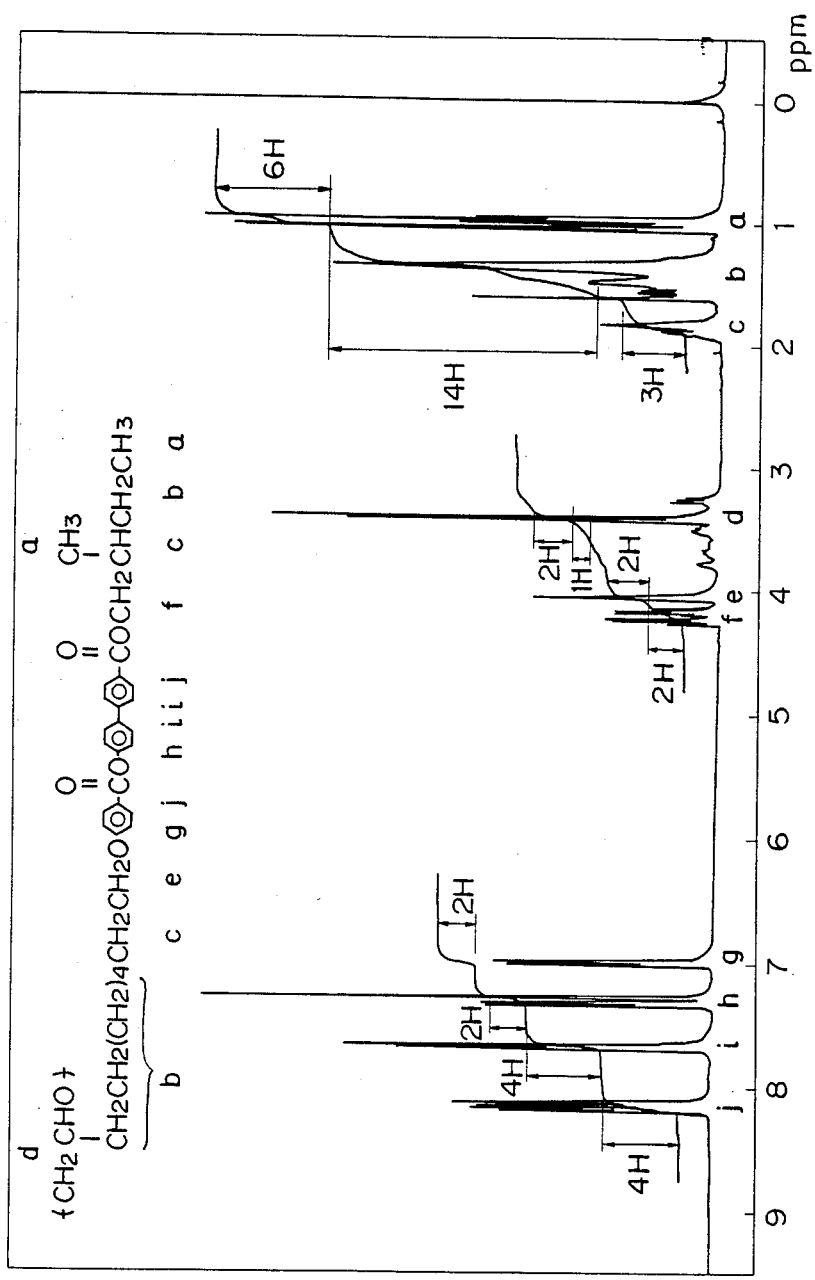
FIG. 4 is an $^1$H-NMR spectrum of the polymer obtained in Example 4.

The number average molecular weight, phase transition behavior, electric field response speed and spontaneous polarization intensity of the obtained polymer are shown in Table 1, and the $^1$H-NMR spectrum is shown in FIG. 4.

EXAMPLE 5

5. (1) Synthesis of 2-methylbutyl p-hydroxybenzoate 4.0 g of p-hydroxybenzoic acid and 12.5 g of 2-methylbutanol were refluxed for 6 hours in toluene in the presence of sulfuric acid while removing water. The resulting reaction solution was then washed with water to remove sulfuric acid. The organic phase was then dried, concentrated, and purified by column chromatography to obtain 5.0 g of the objective ester (liquid, at room temperature, $[\alpha]_D^{23} = +4.9°$ (CHCl$_3$)). (Yield: 83%).

5. (2) Synthesis of 2-methylbutyl 4-[4'-(p-decenyloxy)-benzoyloxy]benzoate

To 4.5 g of p-(9-decenyloxy)benzoic acid prepared by the same way as Example 4.(1) was added toluene and the mixture was cooled with ice. To the mixture was dropped 3.5 g of thionyl chloride while cooling with ice. After dropping thionyl chloride, reaction was carried out for 7 hours at 80° C. After the reaction, the resulting reaction solution was concentrated to obtain an acid chloride compound. 4.5 g of 2-methylbutyl 4-hydroxybenzoate obtained in 5.(1) and 1.8 g of pyridine were dissolved in toluene and the mixture was cooled with ice. Subsequently, a toluene solution of the above-obtained acid chloride compound was dropped thereto. After dropping the tuolene solution, reaction was carried out for 5 hours at 50° C. After the reaction, the resulting reaction solution was washed with water and dried over magnesium sulfate to obtain 5.5 g of the objective ester compound. (Yield: 72%).

5. (3) Conversion to oxirane

The procedure of Example 1.(4) was repeated using 5.5 g of the ester compound obtained in 5.(2) to obtain 5.2 g of a monomer having the structure represented by the following formula. (Yield: 92%).

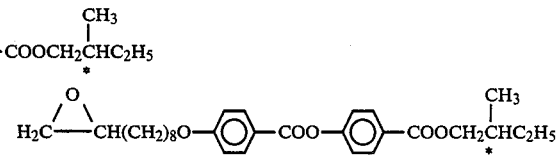

5.(4) Polymerization 5.0 g of the monomer obtained in 5.(3) was polymerized by the procedure of Example 1.(5) to obtain 3.5 g of the objective polyoxirane (Mn=3,600) comprising the repeating units represented by the following formula. (Yield: 70%).

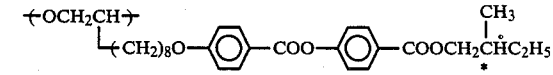

Figure 5:
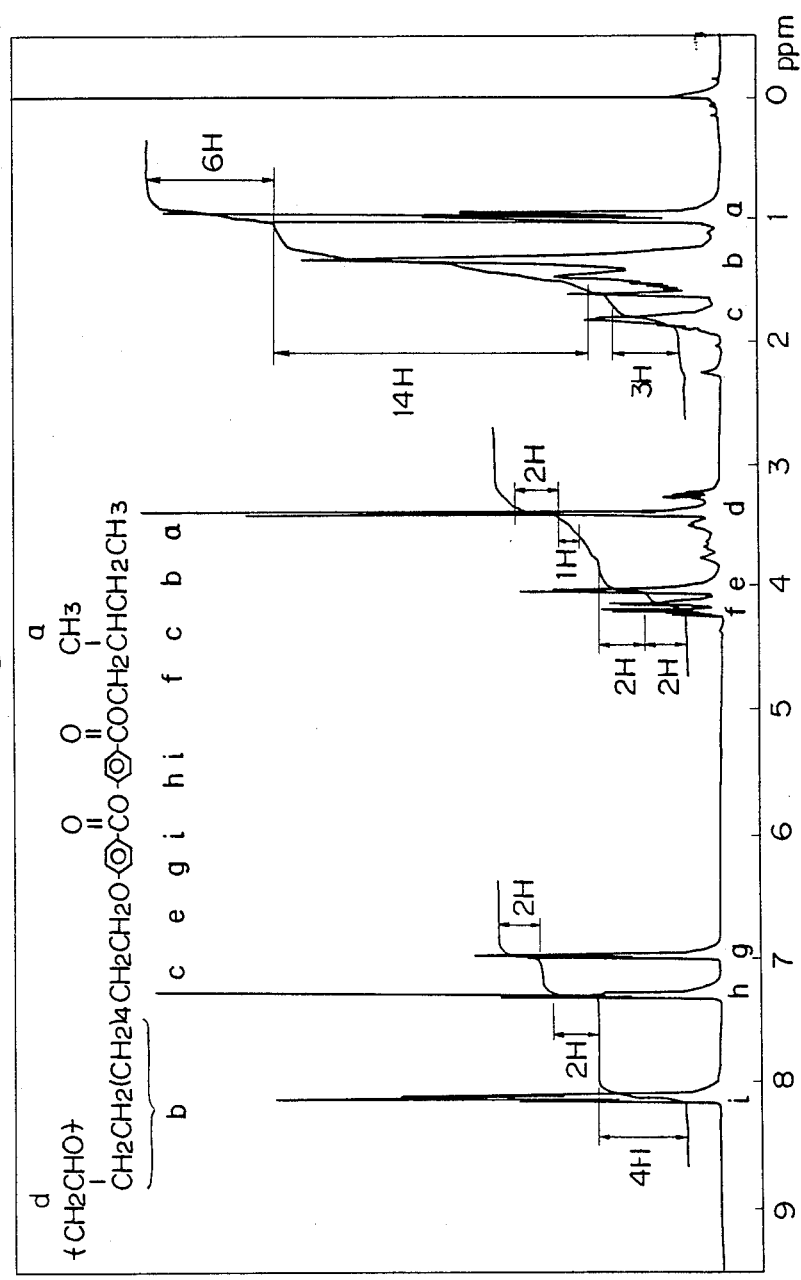
FIG. 5 is an $^1$H-NMR spectrum of the polymer obtained in Example 5.

The number average molecular weight, phase transition behavior, electric field response speed, and spontaneous polarization intensity of the obtained polymer are shown in Table 1, and the $^1$H-NMR spectrum is shown in FIG. 5.

EXAMPLE 6

6.(1) Synthesis of 1-methylpropyl p-hydroxybenzoate

To 23 g of p-acetoxybenzoic acid was dropped 20 g of thionyl chloride. The mixture was heated to 80° C.

and reacted for 3 hours. After the reaction, the excessive thionyl chloride was distilled out under reduced pressure to obtain an acid chloride compound. The acid chloride compound was dissolved in toluene and the resulting solution was cooled with ice. Into the solution was dropped a toluene solution containing 10 g of (+)-2-butanol and 11 g of pyridine. The mixture was then stirred for a night at room temperature. After the reaction, the resulting reaction solution was washed with water, dried, and concentrated under reduced pressure. The resulting residue was dissolved in ether. To the solution was dropped 9 g of benzylamine and the mixture was stirred for one hour at room temperature. After the reaction, the resulting reaction solution was washed with water, dried, and concentrated under reduced pressure. The resulting residue was purified by column chromatography to obtain 19.1 g of the objective ester (liquid, at room temperature, $[\alpha]_D^{23} = +29.6°$ (CHCl$_3$)). (Yield: 77%).

6.(2) Synthesis of 1-methylpropyl 4-[4'-(9-decenyloxy)-benzoyloxy]benzoate

To 13.5 g of p-(9-decenyloxy)benozic acid obtained by the procedure of Example 4.(1) was added toluene and the mixture was cooled with ice. To the solution was dropped 9 g of thionoyl chloride and reaction was then carried out for 3 hours at 80° C. After the reaction, the resulting reaction solution was concentrated to obtain an acid chloride compound. 10 g of 1-methylpropyl 4-hydroxybenzoate obtained in 6.(1) and 4 g of pyridine were dissolved in toluene and the resulting solution was cooled with ice. To the solution was dropped a toluene solution of the above-obtained acid chloride compound, and reaction was carried out for 5 hours at 50° C. After the reaction, the resulting reaction solution was washed with water and dried over magnesium sulfate, and the solvent was distilled out under reduced pressure. The resulting residue was purified by column chromatography to obtain 12.6 g of the objective ester compound. (Yield: 57%).

6(3) Conversion to oxirane

The procedure of Example 1.(4) was repeated using 12.5 g of the ester compound obtained in 6.(2) to obtain 11.6 g of a monomer having the structure represented by the following formula. (Yield: 90%).

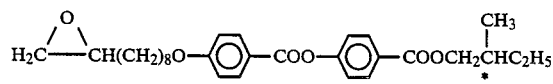

6.(4) Polymerization 11.5 g of the monomer obtained in 6.(3) was polymerized by the procedure of Example 1.(5) to obtain 7.1 g of the objective polyoxirane (Mn=3,300) comprising the repeating units represented by the following formula. (Yield: 62%).

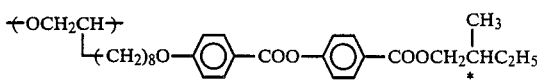

Figure 6:
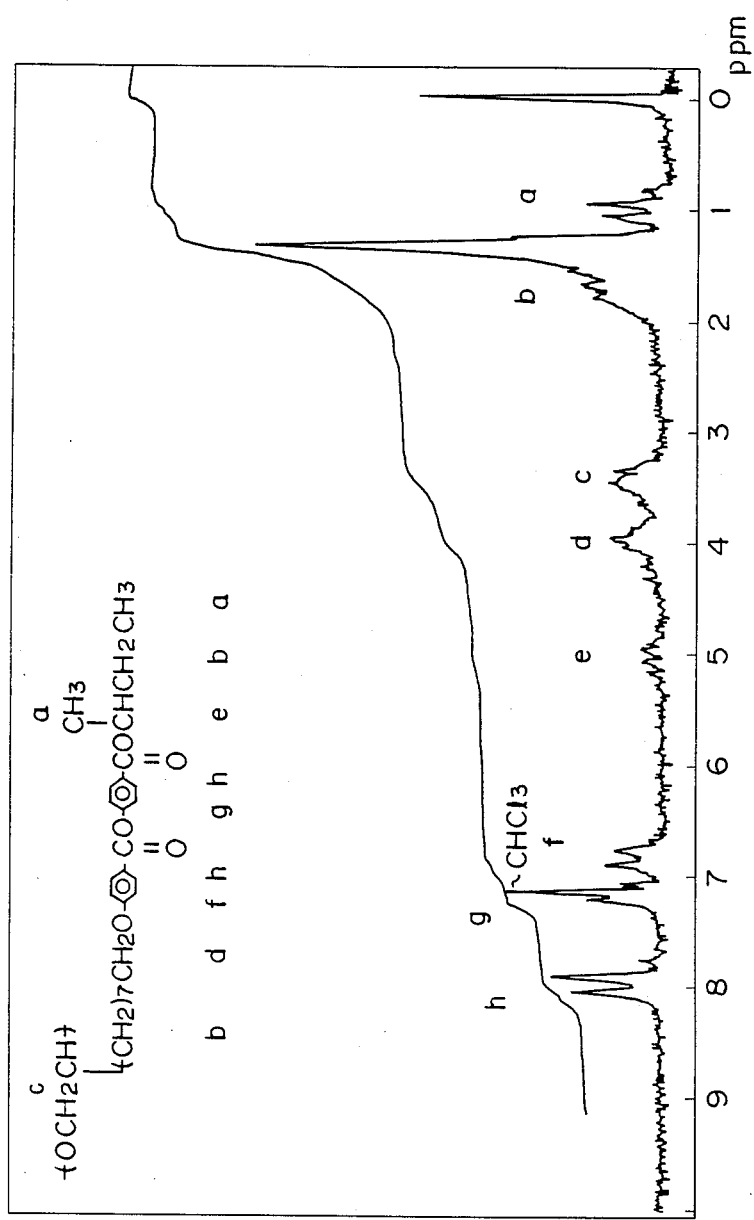
FIG. 6 is an $^1$H-NMR spectrum of the polymer obtained in Example 6.

The number average molecular weight, phase transition behavior, electric field response speed, and spontaneous polarization intensity of the obtained polymer are shown in Table 1, and the $^1$H-NMR spectrum is shown in FIG. 6.

EXAMPLE 7

7.(1) Synthesis of 1-methylbutyl p-hydroxybenzoate

To 25 g of p-acetoxybenzoic acid was dropped 25 g of thionyl chloride. The mixture was heated to 80° C. and reacted for 3 hours. After the reaction, the excessive thionyl chloride was distilled out under reduced pressure to obtain an acid chloride compound. The acid chloride compound was dissolved in toluene and the resulting solution was cooled with ice. To the solution was dropped a toluene solution containing 10.2 g of (−)-2-pentanol and 11 g of pyridine. Subsequently, the mixture was stirred for a night at room temperature. After the reaction, the resulting reaction solution was washed with water, dried, and concentrated under reduced pressure. The resulting residue was dissolved in ether. To the solution was dropped 18 g of benzylamine. The mixture was stirred for one hour at room temperature. After the reaction, the resulting reaction solution was washed with water, dried, and concentrated under reduced pressure. The resulting residue was purified by column chromatography to obtain 20.3 g of the objective ester (liquid, at room temperature, $[\alpha]_D^{23} -27.3°$ (CHCl$_3$)). (Yield: 86%).

7.(2) Synthesis of 1-methylbutyl 4-[4'-(9-decenyloxy)-benzoyloxy]benozoate

To 12.7 g of p-(9-decenyloxy)benzoic acid obtained by the procedure of Example 4.(1) was added toluene and the mixture was cooled with ice. To the mixture was dropped 8.2 g of thionyl chloride, and reaction was carried out at 80° C. for 7 hours. After the reaction, the resulting reaction solution was concentrated to obtain an acid chloride compound. 10.0 g of 1-methylbutyl 4-hydroxybenzoate obtained in 7.(1) and 3.8 g of pyridine were dissolved in toluene, and the solution was cooled with ice. To the solution was dropped a toluene solution of the above-obtained acid chloride compound. Reaction was carried out for 5 hours at 50° C. After the reaction, the resulting reaction solution was washed with water and dried over magnesium sulfate, and the solvent was then distilled out under reduced pressure. The resulting residue was purified by column chroomatography to obtain 15.1 g of the objective ester compound. (Yield: 71%).

7.(3) Conversion to oxirane

The procedure of Example 1.(4) was repeated using 15.1 g of the ester compound obtained in 7.(2) to obtain 14.7 g of a monomer having the structure represented by the following formula. (Yield: 94%).

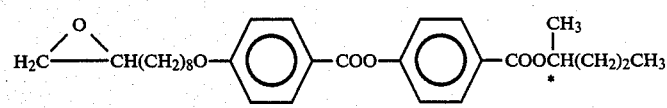

7.(4) Polumerization 14.7 g of the monomer obtained in 7.(3) was polymerized by the procedure of Example 1.(5) to obtain 8.8 g of the objective polyoxirane (Mn=3,600) comprising the repeating units represented by the following formula. (Yield: 60%).

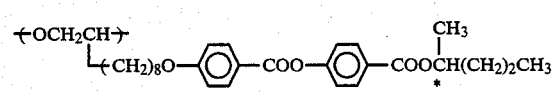

Figure 7:
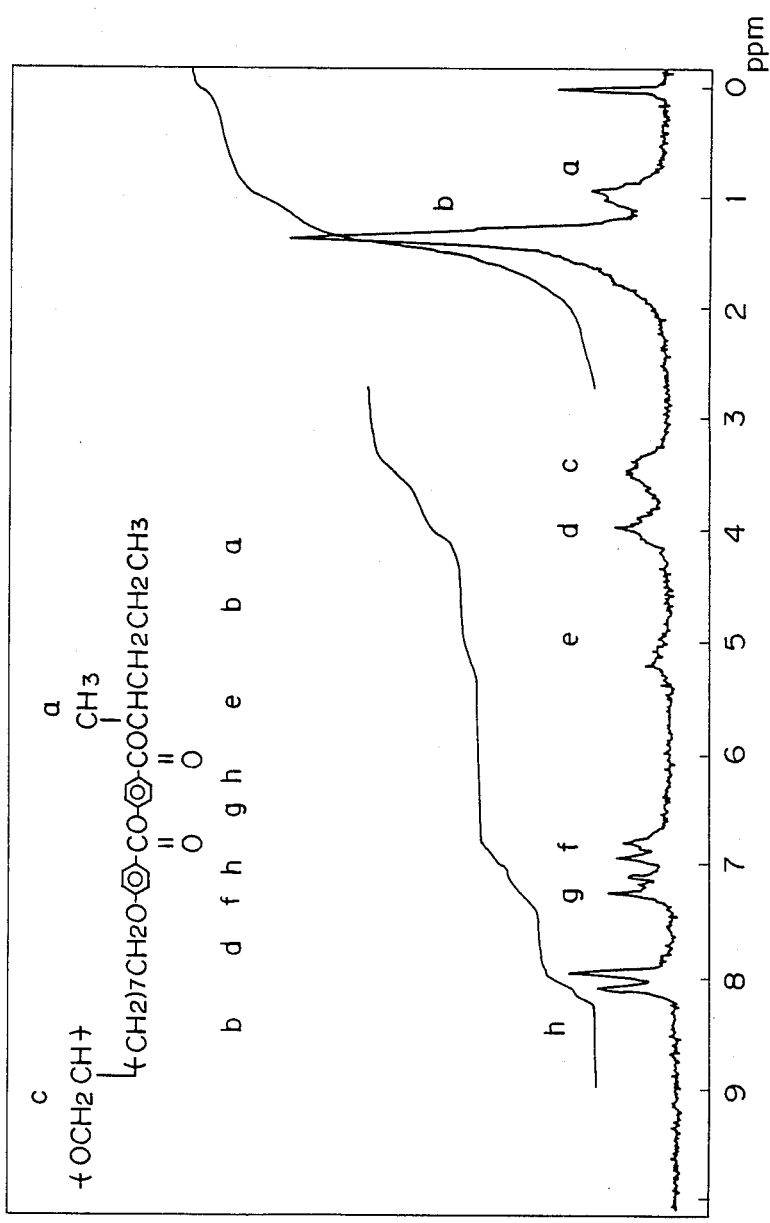
FIG. 7 is an $^1$H-NMR spectrum of the polymer obtained in Example 7.

The number average molecular weight, phase transition behavior, electric field response speed, and spontaneous polarization intensity of the obtained polymer are shown in Table 1, and the $^1$H-NMR spectrum is shonw in FIG. 7.

EXAMPLE 8

8.(1) Synthesis of 1-methylheptyl p-hydroxybenzoate

To 32 g of p-acetoxybenzoic acid was dropped 32 g of thionyl chloride. The mixture was heated to 80° C. and reacted for 3 hours. After the reaction, the excessive thionyl chloride was distilled out under reduced pressure to obtain an acid chloride compound. The acid chloride compound was dissolved in toluene and the resulting solution was cooled with ice. To the solution was dropped a toluene solution containing 25 g of (−)-2-octanol and 16 g of pyridine. The mixture was stirred for a night at room temperature. After the reaction, the resulting reaction solution was washed with water, dried, and concentrated under reduced pressure. The resulting residue was dissolved in ether. To the resulting solution was dropped 21 g of benzylamine. The mixture was stirred for one hour at room temperature. After the reaction, the resulting reaction solution was washed with water, dried, and concentrated under reduced pressure. The resulting residue was purified by column chromatography to obtain 39.9 g of the objective ester (liquid, at room temperature, $[\alpha]_D^{23}$ −33.8° (CHCl$_3$)) (Yield: 83%).

8.(2) Synthesis of 1-methylheptyl 4-[4′-(9-decenyloxy)-benzoyloxy]benzoate

To 9.4 g of p-(9-decenyloxy)benzoic acid prepared by the procedure of Example 4.(1) was added toluene and the mixture was cooled with ice. To the mixture was dropped 6.0 g of thionyl chloride. Subsequently, reaction was carried out for 7 hours at 80° C. After the reaction, the resulting reaction solution was concentrated to obtain an acid chloride compound. 7.7 g of 1-methylheptyl 4-hydroxybenzoate obtained in 8.(1) and 2.7 g of pyridine were dissolved in toluene, and the solution was cooled with ice. To the solution was dropped a toluene solution of the above-obtained acid chloride compound. Subsequently, reaction was carried out for 5 hours at 50° C. After the reaction, the resulting reaction solution was washed with water and dried over magnesium sulfate, and the solvent was then distilled out under reduced pressure. The resulting residue was purified by column chromatography to obtain 9.4 g of the objective ester compound. (Yield: 60%).

8.(3) Conversion to oxirane

The procedure of Example 1.(4) was repeated using 9.4 g of the ester compound obtained in 8.(2) to obtain 9.1 g of a monomer having the structure represented by the following formula. (Yield: 60 %).

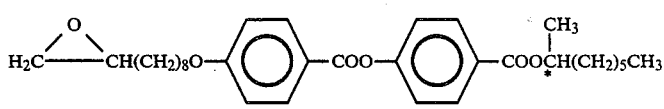

8.(4) Polymerization 9.1 g of the monomer obtained in 8.(3) was polymerized by the procedure of Example 1.(5) to obtain 6.1 g of the objective polyoxirane (Mn=3,800) comprising the repeating units represented by the following formula. (Yield: 60%).

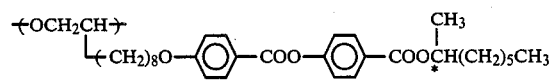

Figure 8:
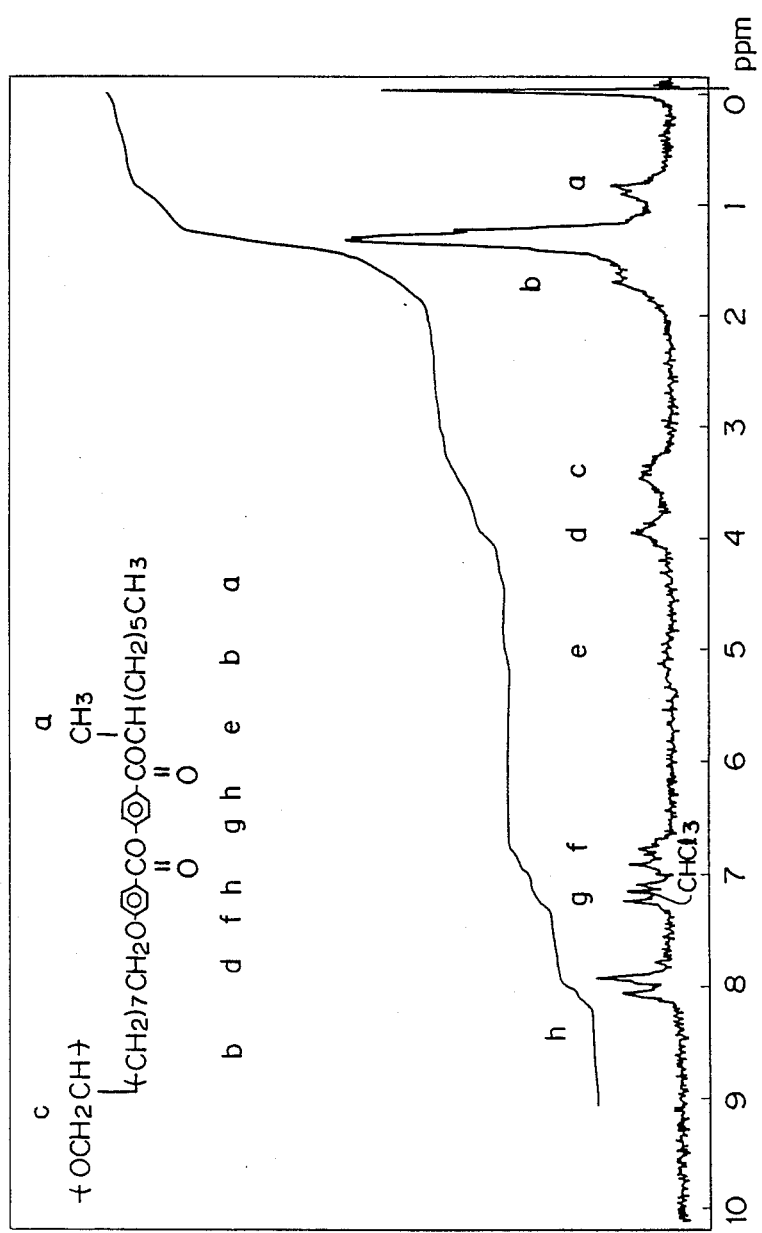
FIG. 8 is an $^1$H-NMR spectrum of the polymer obtained in Example 8.

The number average molecular weight, phase transition behavior, electric field response speed, and spontaneous polarization intensity of the obtained polymer are shown in Table 1, and the $^1$H-NMR spectrum is shown in FIG. 8.

EXAMPLE 9

9.(1) Synthesis of 2-methylbutyl 4-[4′-(9-decenyloxy)-biphenyl-4-carbonyloxy]benzoate To 5.0 g of 4′-(9-decenyloxy)biphenyl-4-carboxylic acid was added toluene and the mixture was cooled with ice. To the mixture was dropped 2.6 g of thionyl chloride. Subsequently, reaction was carried out for 7 hours at 80° C. After the reaction, the resulting reaction solution was concentrated to obtain an acid chloride compound. 3.1 g of 2-methylbutyl 4-hydroxybenzoate prepared by the procedure of Example 5.(1) and 1.5 g of pyridine were dissolved in toluene, and the resulting solution was cooled with ice. To the solution was dropped a toluene solution of the above-obtained acid chloride compound. Subsequently, reaction was carried out for 5 hours at 50° C. After the reaction, the resulting reaction solution was washed with water and dried over magnesium sulfate, and the solvent was then distilled out under reduced pressure. The resulting residue was purified by column chromatography to obtain 5.2 g of the objective ester compound. (Yield: 68%).

9.(2) Conversion to oxirane

The procedure of Example 1.(4) was repeated using 5.2 g of the ester compound obtained in 9.(1) to obtain 4.9 g of a monomer having the structure represented by the following formula. (Yield: 92%).

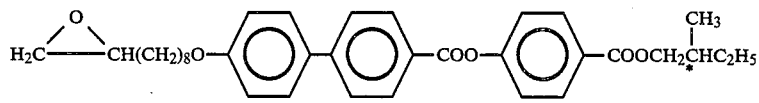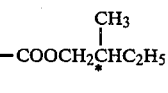

9.(3) Polymerization 4.9 g of the monomer obtained in 9.(2) was polymerized by the procedure of Example 1(5) to obtain 4.3 g of the objective polyoxirane (Mn=3,400) comprising the repeating units represented by the following formula. (Yield: 88%).

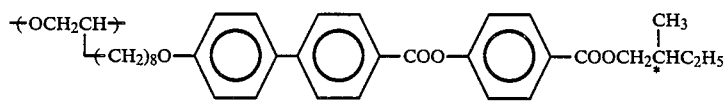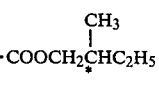

Figure 9:
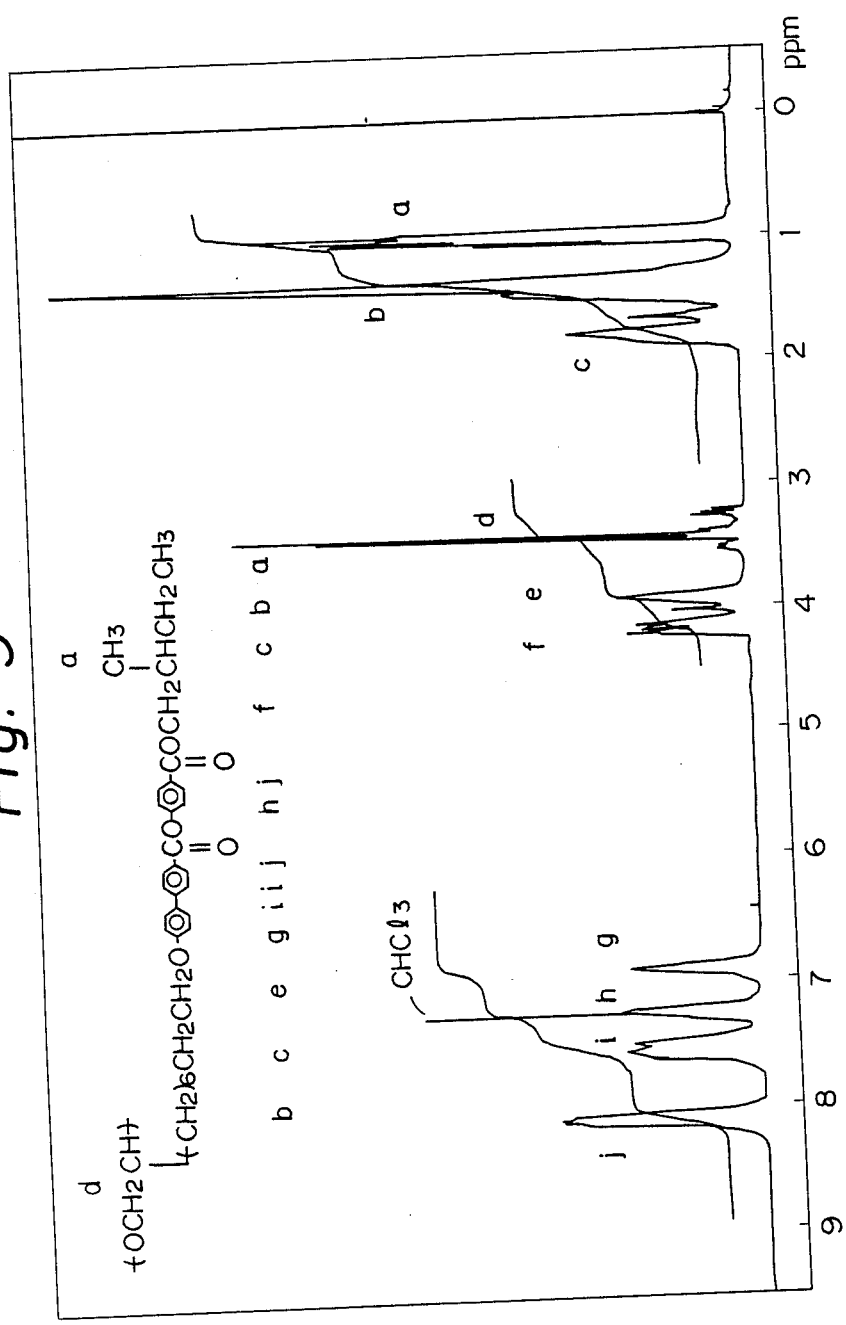
FIG. 9 is an $^1$H-NMR spectrum of the polymer obtained in Example 9.

The number average molecular weigth, phase transition behavior, electric field response speed, and spontaneous polarization intensity of the obtained polymer are shown in Table 1, and the $^1$H-NMR spectrum is shown in FIG. 9.

EXAMPLE 10

10.(1) Synthesis of 2-fluorooctyl p-hydroxybenzoate

To 5.4 g of p-acetoxybenzoic acid was dropped 11 g of thionyl chloride. The mixture was heated to 80° C. and reacted for 3 hours. After the reaction, the excessive thionyl chloride was distilled out under reduced pressure to obtain an acid chloride compound. The acid chloride compound was dissolved in toluene and the resulting solution was cooled with ice. To the solution was dropped a toluene solution containing 4.4 g or (−)-2-fluorooctanol and 3 g of pyridine. The mixture was stirred for a night at room temperature. After the reaction, the reaction solution was washed with water, dried, and concentrated under reduced pressure. The resulting residue was dissolved in ether. To the resulting solution was dropped 10 g of benzylamine. The mixture was stirred for 5 hours at room temperature. After the reaction, the resulting reaction solution was washed with water, dried, and concentrated under reduced pressure. The resulting residue was purified by column chromatography to obtain 4.9 g of the objective ester. (Yield: 73%).

10.(2) Synthesis of 2-fluorooctyl 4-[4'-(9-decenyloxy)-benzoyloxy]benzoate

To 3.0 g of p-(9-decenyloxy)benzoic acid prepared by the procedure of Example 4.(1) was added toluene and the mixture was cooled with ice. To the mixture was dropped 2.0 g of thionyl chloride. Subsequently, reaction was carried out for 3 hours at 80° C. After the reaction, the resulting reaction solution was concentrated to obtain an acid chloride compound. 1.7 g of 2-fluoroocyl 4-hydroxybenzoate obtained in 10.(1) and 0.9 g of pyridine were dissolved in toluene, and the solution was cooled with ice. To the solution was dropped a toluene solution of the above-obtained acid chloride compound. Subsequently, reaction was carried out for 15 hours at room temperature. After the reaction, the resulting reaction solution was washed with water and dried over magnesium sulfate, and the solvent was then distilled out under reduced pressure. The residue was purified by column chromatography to obtain 2.8 g of the objective ester compound. (Yield: 85%).

10.(3) Conversion to oxirane

The procedure of Example 1.(4) was repeated using 2.8 g of the ester compound obtained in 10.(2) to obtain 2.6 g of a monomer having the structure represented by the following formula. (Yield: 91%).

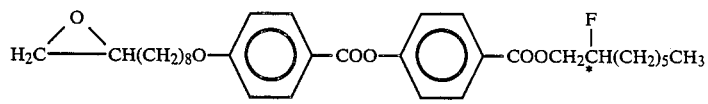

10.(4) Polymerization 2.6 g of the monomer obtained in 10.(3) was polymerized by the procedure of Example 1.(5) to obtain 2.2 g of the objective polyoxirane (Mn=3,000) comprising the repeating units represented by the following formula. (Yield: 84%).

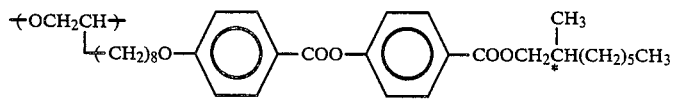

Figure 10:
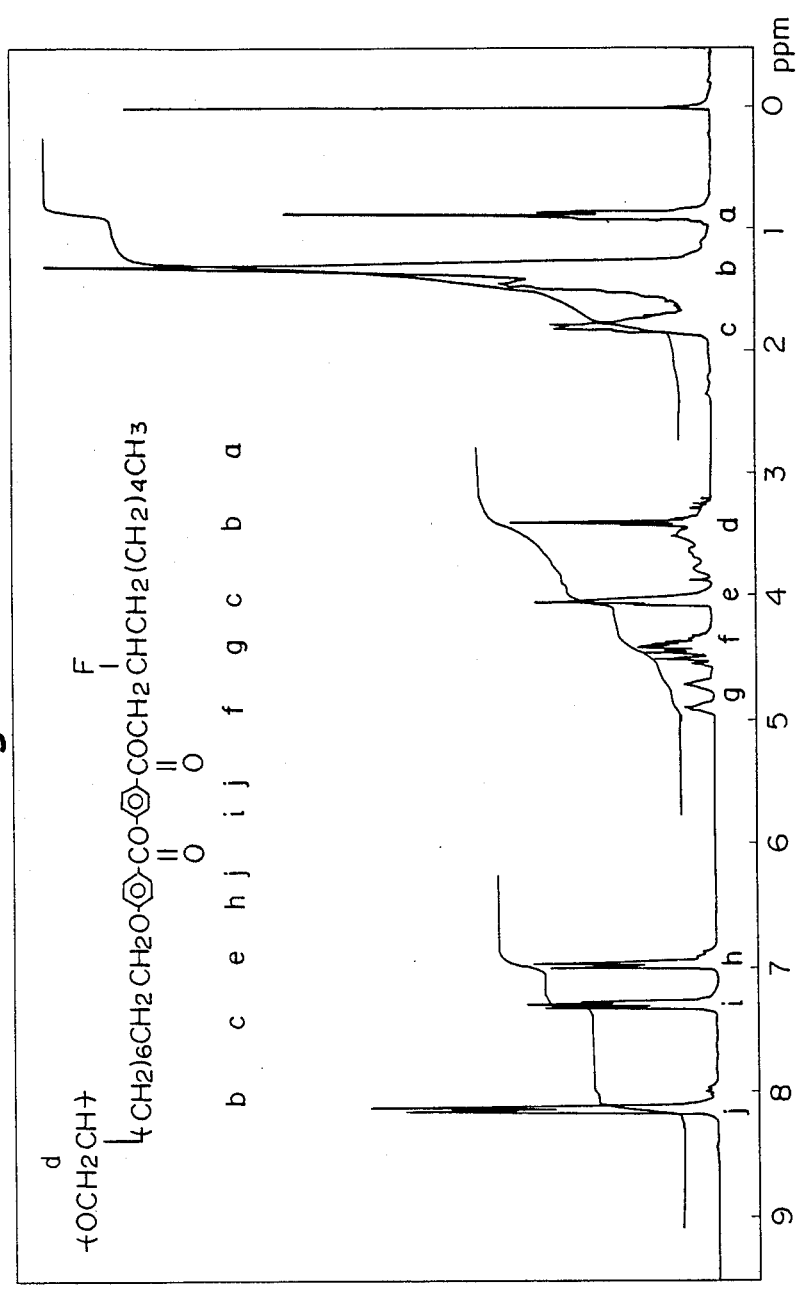
FIG. 10 is an $^1$H-NMR spectrum of the polymer obtained in Example 10.

The number average molecular weight, phase transition behavior, electric field response speed, and spontaneous polarization intensity of the obtained polymer are shown in Table 1, and the $^1$H-NMR spectrum is shonw in FIG. 10.

EXAMPLE 11

11.(1) Synthesis of 2-methylbutyl 4'-(5-hexenyloxy)-biphenyl-4-carboxylate 4.7 g of 6-bromo-1-hexene, 6.3 g of 2-methylbutyl 4'-hydroxybiphenyl-4-carboxylate, and 3.1 g of potassium carbonate were refluxed in 2-butanone for 20 hours. After the reaction, inorganic salt was removed by washing with water. After organic phase was dried over magnesium sulfate, the solvent was distilled out under reduced pressure. The resulting residue was purified by column chromatography to obtain 6.4 g of the objective ester compound. (Yield: 79%).

11.(2) Conversion to oxirane

The procedure of Example 1.(4) was repeated using 1.7 g of the ester compound obtained in 11.(1) to obtain 1.6 g of a monomer having the structure represented by the following formula. (Yield: 89%).

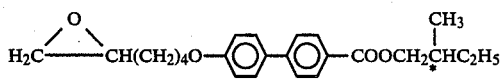

11(3) Polymerization 1.6 g of the monomer obtained in 11.(2) was polymerized by the same procedure as Example 1.(5) to obtain 1.0 g of the objective polyoxirane (Mn=3,000) comprising the repeating units represented by the following formula. (Yield: 63%).

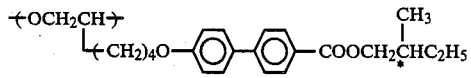

Figure 11:
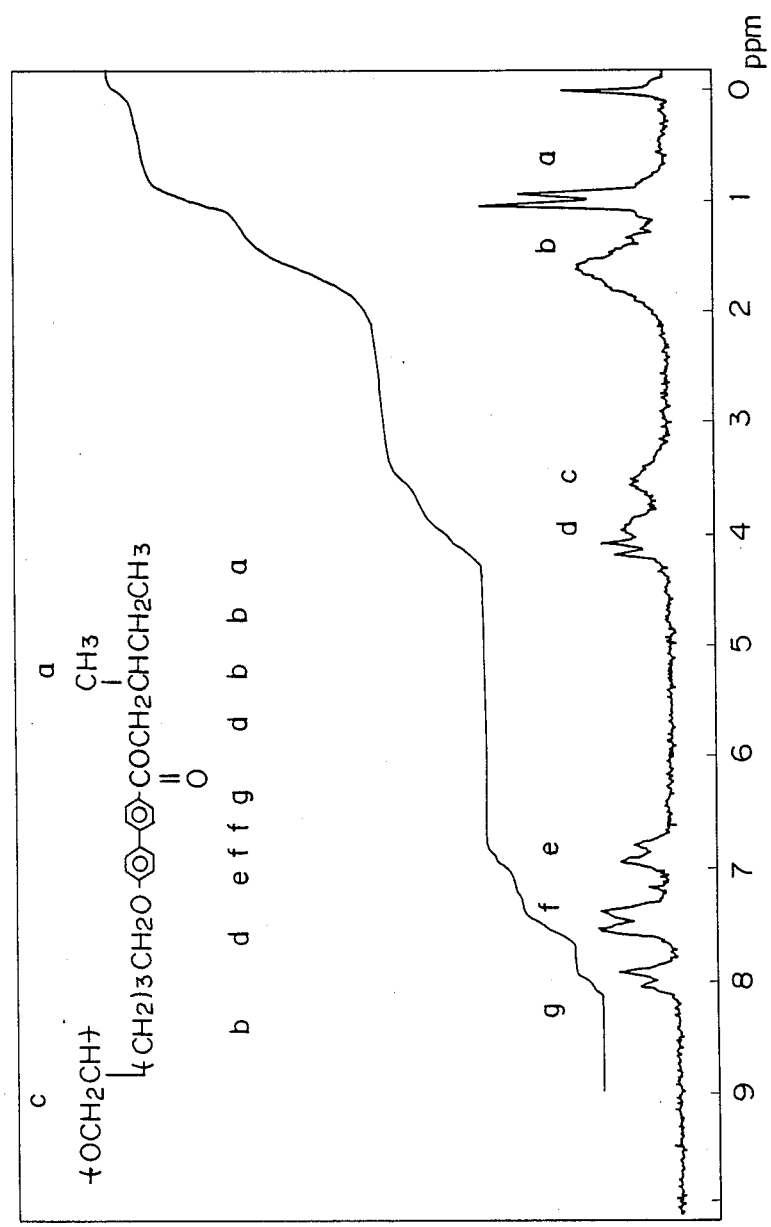
FIG. 11 is an $^1$H-NMR spectrum of the polymer obtained in Example 11.

The number average molecular weight, phase transition behavior, electric field response speed, and spontaneous polarization intensity of the obtained polymer are shown in Table 1, and the $^1$H-NMR spectrum is shown in FIG. 11.

EXAMPLE 12

12.(1) Synthesis of p-(7-octenyloxy)benzoic acid 9.4 g of 8-bromo-1-octene, 9.0 g of ethyl p-hydroxybenzoate, and 7.6 g of potassium carbonate were refluxed in ethanol for 10 hours. To the resulting reaction mixture was added an aqueous sodium hydroxide solution containing 2.4 g of sodium hydroxide, and the mixture was then further refluxed for 10 hours. After the reaction, the resulting reactioin solution was diluted with water, and the pH of the solution was adjusted to 2 by dropping hydrochloric acid. The resulting precipitate was corrected, sufficiently washed with water, and dried to obtain 10.8 g of the objective ether compound (Yield: 89 %).

12.(2) Synthesis of 2-methylbutyl 4-[p-(7-octenyloxy)-benzoyloxy]biphenyl-4-carboxylate To 9 g of p-(7-octneyloxy)benzoic acid obtained in 12.(1) was suspended in toluene, and the suspension was cooled with ice. To the suspension was dropped 6 g of thionyl chloride. After dropping thionyl chloride, temperature was raised to 80° C. and reaction was carried out for 6 hours. After the reaction, the resulting reaction mixture was concentrated under reduced pressure to obtain an acid chloride compound. A toluene solution of the acid chloride compound was prepared by adding toluene and the resulting solution was cooled with ice. To the toluene solution was dropped a toluene solution containing 10 g of 2-methylbutyl 4'-hydroxybiphenyl-4-carboxylate and 3 g of pyridine. After dropping the toluene solution, temperature was raised to 50° C. and reaction was carried out for 8 hours. After the reaction, the reaction solution was washed with water, dried over magnesium sulfate, and concentrated under reduced pressure. The residue was recrystallized from ethanol to obtain 8.2 g of the objective ester compound. (Yield: 45%).

12.(3) Conversion to oxirane 7.2 g of the ester compound obtained in 12.(2) was oxidized with 3 g of m-chloroperbenzoic acid to obtain 6.3 g of a monomer having the structure represented by the following formula. (Yield: 85%).

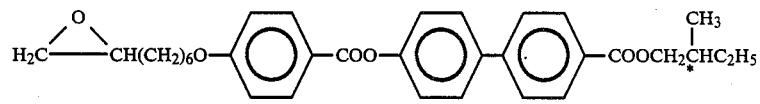

12.(4) Polymerization 1.8 g of the monomer obtained in 12.(3) was polymerized by the same procedure as Example 1.(5) to obtain 1.5 g of the objective polyoxirane (Mn=5,100) comprising the repeating units represented by the following formula. (Yield: 83%).

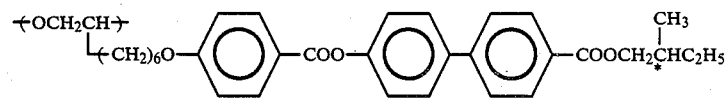

Figure 12:
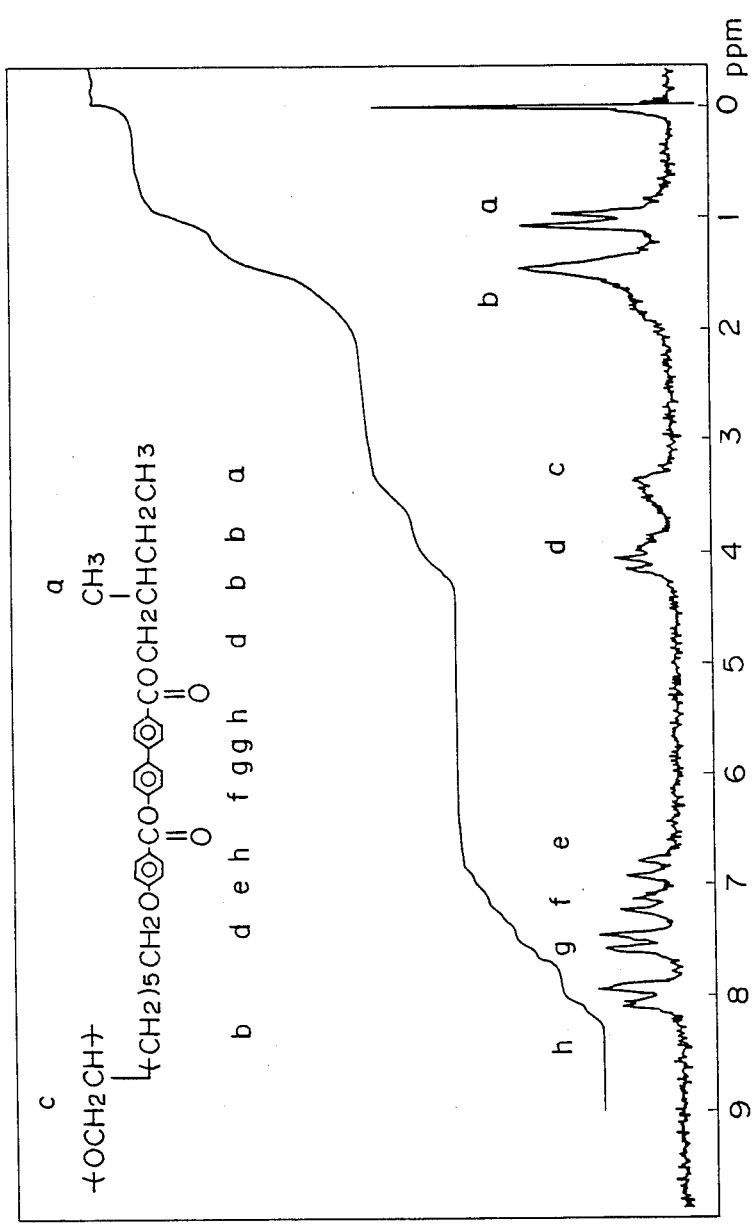
FIG. 12 is an $^1$H-NMR spectrum of the polymer obtained in Example 12.

The number average molecular weight, phase transition behavior, electric field response speed, and spontaneous polarization intensity of the obtained polymer are shown in Table 1, and the $^1$H-NMR spectrum is shown in FIG. 12.

EXAMPLE 13

13.(1) Synthesis of 2-chloro-3-methylpentyl p-hydroxybenzoate

To 24 g of p-acetoxybenzoic acid was dropped 32 g of thionyl chloride. The mixture was heated to 80° C. and reacted for 3 hours. After the reaction, the excessive thionyl chloride was distilled out under reduced pressure to obtain an acid chloride compound. The acid chloride compound was dissolved in toluene and the solution was cooled with ice. To the resulting solution was dropped a toluene solution containing 13.7 g of (—)-2-chloro-3-methylpentanol and 14 g of triethylamine. The mixture was stirred for a night at room temperature. After the reaction, the resulting reaction solution was washed with water, dried, and concentrated under reduced pressure. The residue was dissolved in ether. To the solution was dropped 17 g of benzylamine. The mixture was stirred for one hour at room temperature. After the reaction, the resulting reaction solution was washed with water, dried, and concentrated under reduced pressure. The residue was purified by column chromatography to obtain 20.3 g of the objective ester $[\alpha]_D^{23}+11.6°$ (CHCl$_3$)). (Yield;79%).

13.(2) Synthesis of 2-chloro-3-methylpentyl 4[4'-(9-decenyloxy) benzoyloxy]benzoate To 0.82 g of p-(decenyloxy)benzoic acid prepared by the procedure of Example 4.(1) was added toluene and the mixture was cooled with ice. To the mixture was dropped 1.1 g of thionyl chloride, and reaction was carried out for 7 hours at 80° C. After the reaction, the resulting reaction solution was concentrated to obtain an acid chloride compound. 0.76 g of 2-chloro-3-methylpentyl p-hydroxybenzoate and 0.5 g of pyridine were dissolved in toluene, and the resulting solution was cooled with ice. To the solution was dropped a toluene solution of the above-obtained acid chloride compound. Reaction was carried out for 15 hours at rool temperature. After the reaction, the resulting reaction solution was washed with water and dried over magnesium sulfate, and the solvent was then distilled out under reduced pressure. The residue was purified by column chromatography to obtain 1.14 g of the objective ester compound. (Yield: 74%).

13.(3) Conversion to oxirane

The procedure of Example 1.(4) was repeated using 5.2 g of the ester compound obtained in 13.(2) to obtain 0.48 g of a monomer having the structure represented by the following formula. (Yield: 90%).

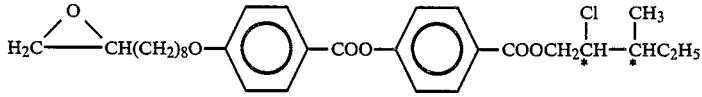

13.(4) Polymerization 0.48 g of the monomer obtained in 13.(3) was polymerized by the same procedure as Example 1.(5) to obtain 0.44 g of the objective polyoxirane (Mn=2,800) comprising the repeating units represented by the following formula. (Yield: 92%).

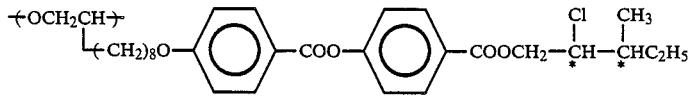

Figure 13:
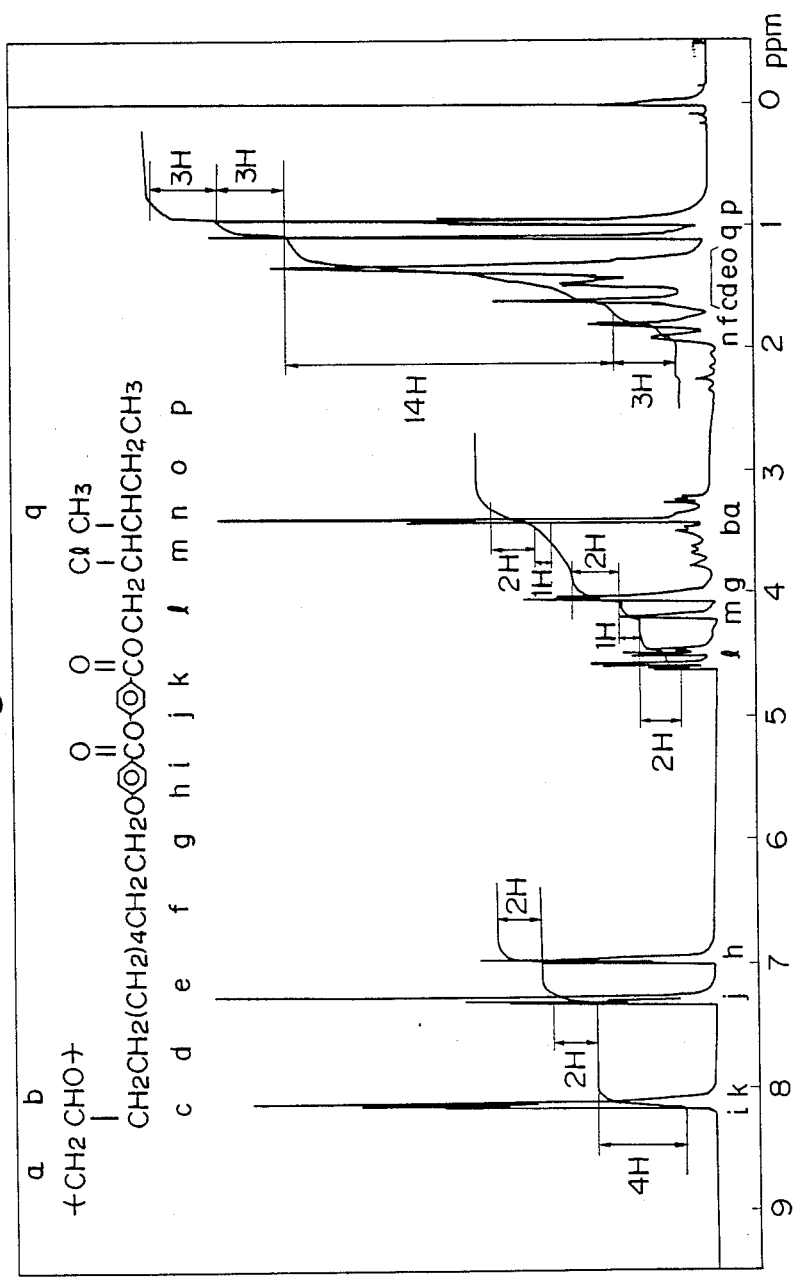
FIG. 13 is an $^1$H-NMR spectrum of the polymer obtained in Example 13.

The number average molecular weight, phase transition behavior, electric field response speed, and spontaneous polarization intensity of the obtained polymer are shown in Table 1, and the $^1$H=NMR spectrum is shown in FIG. 13.

EXAMPLE 14

14.(1) Synthesis of 2-chloro-3-methylpentyl 4'-(9-decenyloxy)biphenyl-4-carboxylate To 4.0 g of 4'-(9-decenyloxy0biphenyl-4-carboxylic acid was added toluene, and the mixture was cooled with ice. To the mixture was dropped 2.0 g of thionyl chloride. Reaction was carried out for 7 hours at 80° C. After the reaction, the resulting reaction solution was concentrated to obtain an acid chloride compound. 1.7 g of 2-chloro-3-methylpentanol and 1.0 g of pyridine were dissolved in toluene and the solution was cooled with ice. To the solution was dropped a toluene solution of the above-obtained acid chloride compound. Reaction was carried out for 15 hours at room temperature. After the reaction, the reaction solution was washed with water and dried over magnesium sulfate, and the solvent was then distilled out under reduced pressure. The residue was purified by column chromatography to obtain 4.3 g of the onjective ester compound. (Yield: 80%).

14.(2) Conversion to oxirane

The procedure of Example 1.(4) was repeated using 4.3 g of the ester compound obtained in 14.(1) to obtain 4.2 g of a monomer having the structure represented by the following formula. (Yield: 95%).

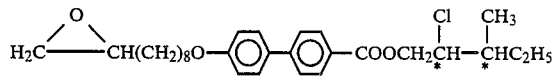

14.(3) Polymerization 4.2 g of the monomer obtained in 14.(2) was polymerized by the same procedure as Example 1.(5) to obtain 3.2 g of the objective polyoxirane (Mn=3,300) comprising the repeating units represented by the following formula. (Yield: 76%).

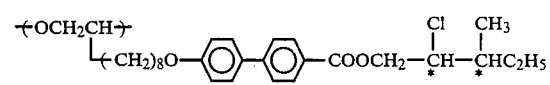

Figure 14:
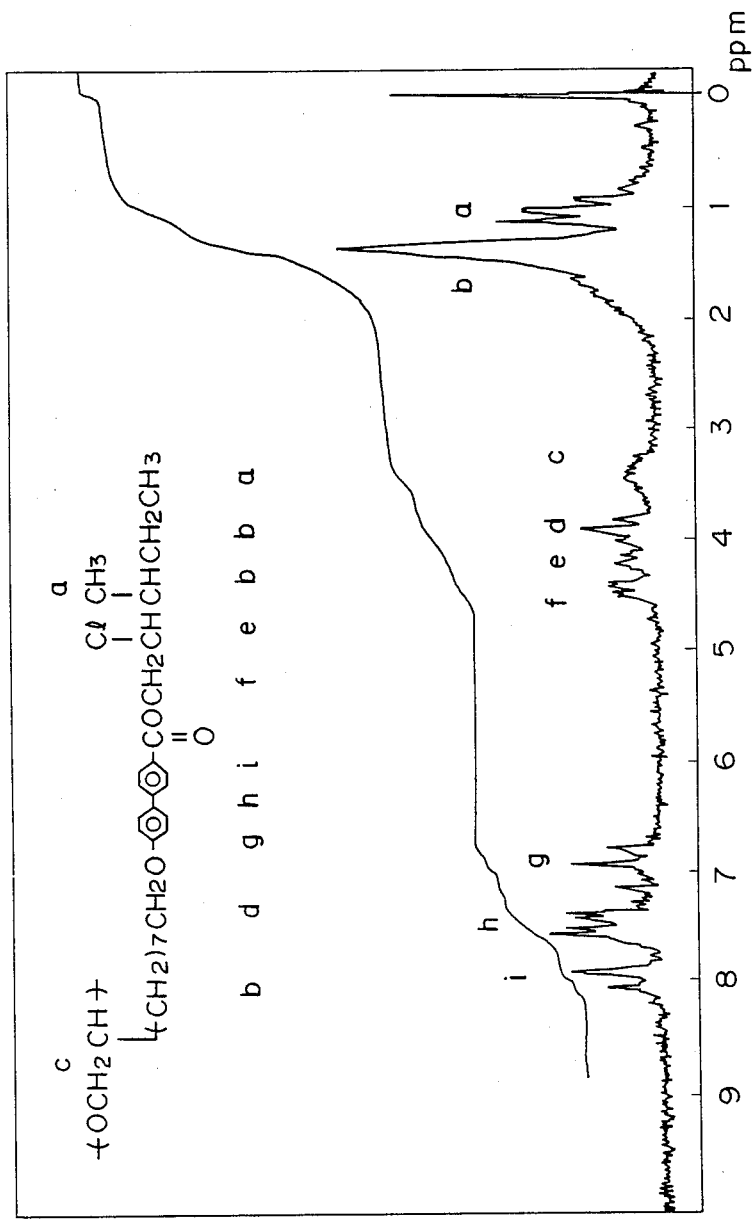
FIG. 14 is an $^1$H-NMR spectrum of the polymer obtained in Example 14.

The number average molecular weight, phase transition behavior, electric field response speed, and spontaneous polarization intensity of the obtained polymer are shown in Table 1, and the $^1$H=NMR spectrum is shown in FIG. 14.

TABLE 1

| Example No. | Repeating unit | Number average molecular weight | Phase transition temperature (°C.) | Response time (sec.) | Measuring temp. (°C.) | Spontaneous polarization intensity (nc/cm²) |
|---|---|---|---|---|---|---|
| 1 | −(OCH₂CH)− with side chain −(CH₂)₈O−⬡−⬡−COO−⬡−COOCH₂CHC₂H₅ (with CH₃ and *) | 2,800 | glass $\xrightarrow{-13}_{\xleftarrow{-21}}$ S₁ $\xrightarrow{22}_{\xleftarrow{20}}$ SmC* $\xrightarrow{40}_{\xleftarrow{33}}$ SmA $\xrightarrow{83}_{\xleftarrow{77}}$ Iso | 0.02 | 30 | 9.5 |
| 2 | −(OCH₂CH)− with side chain −(CH₂)₁₀O−⬡−⬡−COO−⬡−COOCH₂CHC₂H₅ (with CH₃ and *) | 3,200 | S₁ $\xrightarrow{24}_{\xleftarrow{16}}$ SmC* $\xrightarrow{49}_{\xleftarrow{33}}$ SmA $\xrightarrow{89}_{\xleftarrow{84}}$ Iso | 0.15 | 30 | 7.0 |
| 3 | −(OCH₂CH)− with side chain −(CH₂)₆O−⬡−⬡−COO−⬡−COOCH₂CHC₂H₅ (with CH₃ and *) | 3,300 | glass $\xrightarrow{-12}_{\xleftarrow{-19}}$ S₁ $\xrightarrow{25}_{\xleftarrow{25}}$ SmC* $\xrightarrow{35}_{\xleftarrow{28}}$ SmA $\xrightarrow{72}_{\xleftarrow{67}}$ Iso | 0.30 | 27 | 9.5 |
| 4 | −(OCH₂CH)− with side chain −(CH₂)₈O−⬡−COO−⬡−⬡−COOCH₂CHC₂H₅ (with CH₃ and *) | 4,100 | S₁ $\xrightarrow{22}_{\xleftarrow{20}}$ SmC* $\xrightarrow{123}_{\xleftarrow{120}}$ SmA $\xrightarrow{153}_{\xleftarrow{149}}$ N* $\xrightarrow{156}_{\xleftarrow{152}}$ Iso | 0.30 / 0.01 | 50 / 100 | 11.0 |
| 5 | −(OCH₂CH)− with side chain −(CH₂)₈O−⬡−COO−⬡−COO−⬡−COOCH₂CHC₂H₅ (with CH₃ and *) | 3,600 | glass $\xrightarrow{-30}_{\xleftarrow{-31}}$ S₁ $\xrightarrow{0}_{\xleftarrow{0}}$ SmC* $\xrightarrow{35}_{\xleftarrow{33}}$ SmA $\xrightarrow{53}_{\xleftarrow{52}}$ Iso | 0.002 | 30 | 8.0 |
| 6 | −(OCH₂CH)− with side chain −(CH₂)₈O−⬡−COO−⬡−⬡−COOCHC₂H₅ (with CH₃ and *) | 3,300 | glass $\xrightarrow{-8}_{\xleftarrow{-9}}$ SmC* $\xrightarrow{38.5}_{\xleftarrow{30}}$ Iso | 0.005 | 25 | 9.0 |
| 7 | −(OCH₂CH)− with side chain −(CH₂)₈O−⬡−COO−⬡−COO−⬡−COOCH(CH₂)₂CH₃ (with CH₃ and *) | 3,600 | glass $\xrightarrow{-10}_{\xleftarrow{-10.5}}$ SmC* $\xrightarrow{22}_{\xleftarrow{18.5}}$ Iso | 0.006 | 15 | 80 |
| 8 | −(OCH₂CH)− with side chain −(CH₂)₈O−⬡−COO−⬡−COO−⬡−COOCH(CH₂)₅CH₃ (with CH₃ and *) | 3,800 | glass $\xrightarrow{-19}_{\xleftarrow{-22}}$ SmC* $\xrightarrow{-5}_{\xleftarrow{-9}}$ Iso | 0.1 | −15 | 10 |
| 9 | −(OCH₂CH)− with side chain −(CH₂)₈O−⬡−COO−⬡−⬡−COOCH₂CHC₂H₅ (with CH₃ and *) | 3,400 | S₁ $\xrightarrow{22}_{\xleftarrow{20}}$ SmC* $\xrightarrow{115}_{\xleftarrow{100}}$ SmA $\xrightarrow{157}_{\xleftarrow{155}}$ N* $\xrightarrow{163}_{\xleftarrow{159}}$ Iso | 0.01 | 95 | 7.0 |
| 10 | −(OCH₂CH)− with side chain −(CH₂)₈O−⬡−COO−⬡−COO−⬡(F)−COOCH₂CH(CH₂)₅CH₃ (with *) | 3,000 | Cry $\xrightarrow{38}_{\xleftarrow{27}}$ SmC* $\xrightarrow{47}_{\xleftarrow{47}}$ N* $\xrightarrow{57}_{\xleftarrow{57}}$ Iso | 0.002 / 0.001 | 35 / 40 | 75 / 60 |

TABLE 1-continued

| Example No. | Repeating unit | Number average molecular weight | Phase transition temperature (°C.) | Response time (sec.) | Measuring temp. (°C.) | Spontaneous polarization intensity (nc/cm²) |
|---|---|---|---|---|---|---|
| 11 | ‒(OCH$_2$CH)‒ <br>     (CH$_2$)$_4$O—⟨◯⟩—⟨◯⟩—COOCH$_2$CHC$_2$H$_5$ <br>                                           CH$_3$ | 3,000 | glass $\underset{-5}{\overset{0.5}{\rightleftarrows}}$ S$_1$ $\underset{17}{\overset{18}{\rightleftarrows}}$ SmC* $\underset{23}{\overset{27.5}{\rightleftarrows}}$ SmA $\underset{62.5}{\overset{67}{\rightleftarrows}}$ Iso | 0.006 | 20 | 8.0 |
| 12 | ‒(OCH$_2$CH)‒ <br>     (CH$_2$)$_6$O—⟨◯⟩—COO—⟨◯⟩—COOCH$_2$CHC$_2$H$_5$ <br>                                             CH$_3$ | 5,100 | S$_1$ $\underset{47}{\overset{47}{\rightleftarrows}}$ SmC* $\underset{165}{\overset{165}{\rightleftarrows}}$ N $\underset{180}{\overset{180}{\rightleftarrows}}$ N* $\underset{190}{\overset{191}{\rightleftarrows}}$ Iso | 0.01<br>0.04 | 110<br>60 | 8.5<br>10 |
| 13 | ‒(OCH$_2$CH)‒ <br>     (CH$_2$)$_8$O—⟨◯⟩—COO—⟨◯⟩—COOCH$_2$CH—CHC$_2$H$_5$ <br>                                             Cl  CH$_3$ | 2,800 | Cry $\overset{38.5}{\rightarrow}$ Iso $\overset{34.5}{\searrow}$ SmC* $\overset{-23}{\nwarrow}$ | 0.007 | 30 | 55 |
| 14 | ‒(OCH$_2$CH)‒ <br>     (CH$_2$)$_8$O—⟨◯⟩—⟨◯⟩—COOCH$_2$CH—CHC$_2$H$_5$ <br>                                           Cl  CH$_3$ | 3,300 | Cry $\underset{12}{\overset{12}{\rightleftarrows}}$ SmC* $\underset{65}{\overset{65}{\rightleftarrows}}$ SmA $\underset{84}{\overset{105}{\rightleftarrows}}$ Iso | 0.002 | 40 | 63 |

EXAMPLE 15

The procedure of Example 1 was repeated with the exception that the amount of stannic chloride used in polymerization reaction was changed to 0.03 g, and 0.4 g of a polyoxirane (Mn=1,700) comprising the same repeating units as those of the polyoxirane obtained in Example 1 was obtained. (Yield 80%).

Figure 15:
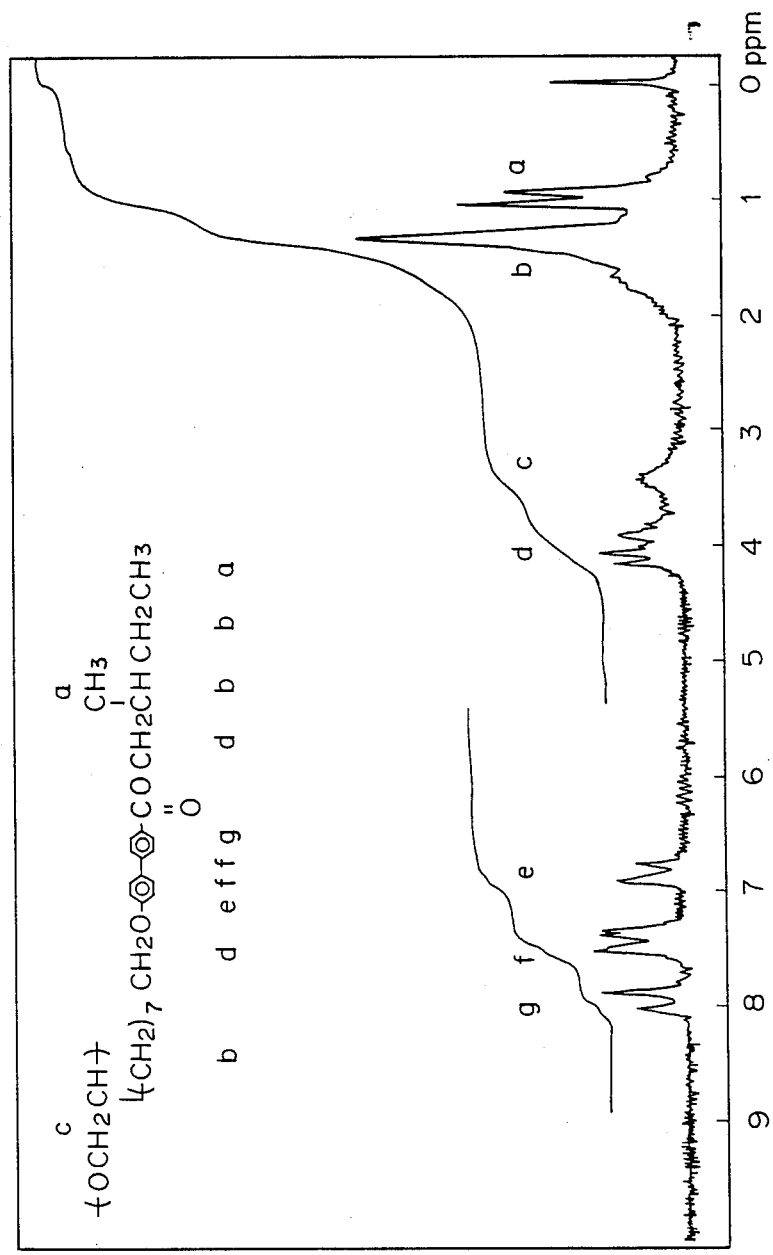
FIG. 15 is an $^1$H-NMR spectrum of the polymer obtained in Example 15.

The number average moleculra weight, phase transition behavior, and electric field response speed of the obtained polymer are shown in Table 2, and the $^1$H-NMR spectrum is shown in FIG. 15.

EXAMPLE 16

The procedure of Example 2 was repeated with the exception that the amount of stannic chloride used in polymerization reaction was changed to 0.08 g, and 1.5 g of a polyoxirane (Mn=1,500) comprising the same repeating units as those of the polyoxirane obtained in Example 2 was obtained. (Yield: 65%).

Figure 16:
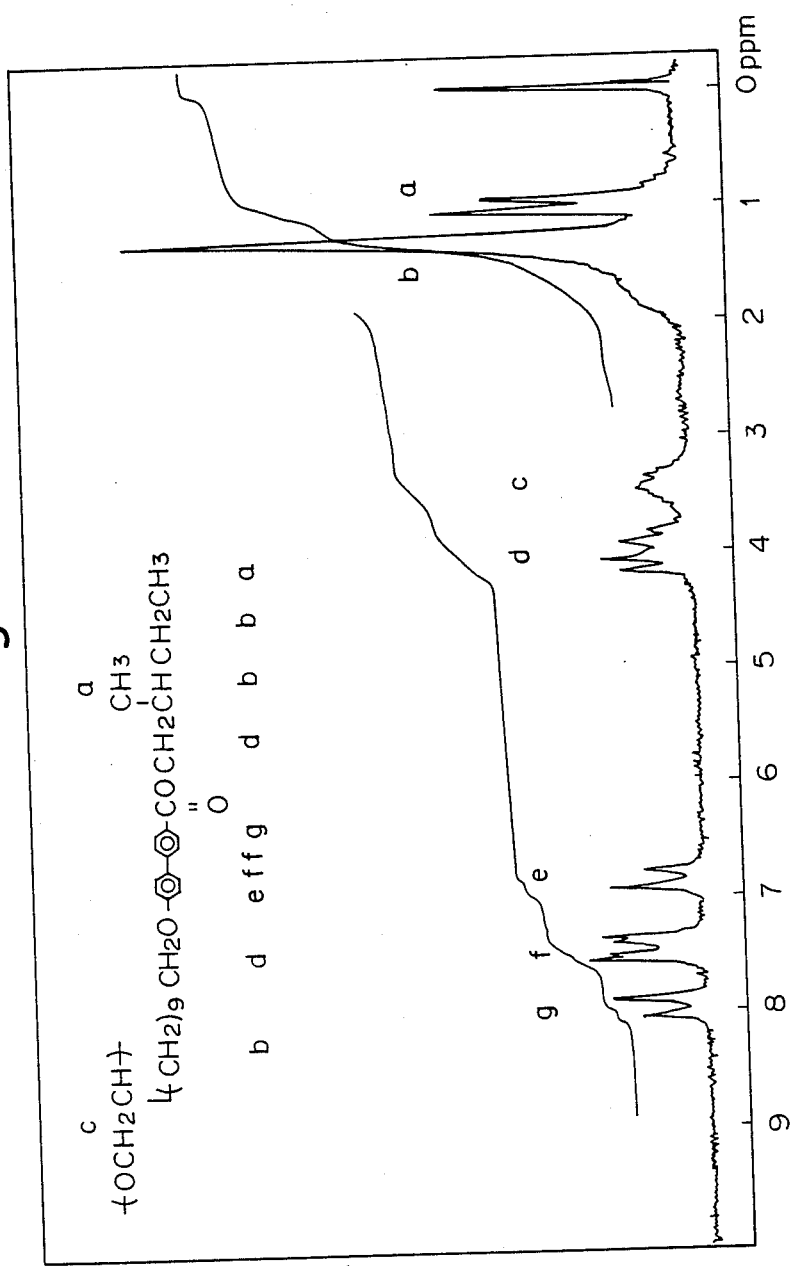
FIG. 16 is an $^1$H-NMR spectrum of the polymer obtained in Example 16.

The number average molecular weight, phase transition behavior, and electric field response speed of the obtained polymer are shown in Table 2, and the $^1$H-NMR spectrum is shown in FIG. 16.

EXAMPLE 17

The procedure of Example 3 was repeated with the exception that the amount of stannic chloride used in polymerization reaction was changed to 0.08 g, and 1.4 g of a polyoxirane (Mn=1,600) comprising the same repeating nits as those of the polyoxirane obtained in Example 3 was obtained. (Yield: 68%).

Figure 17:
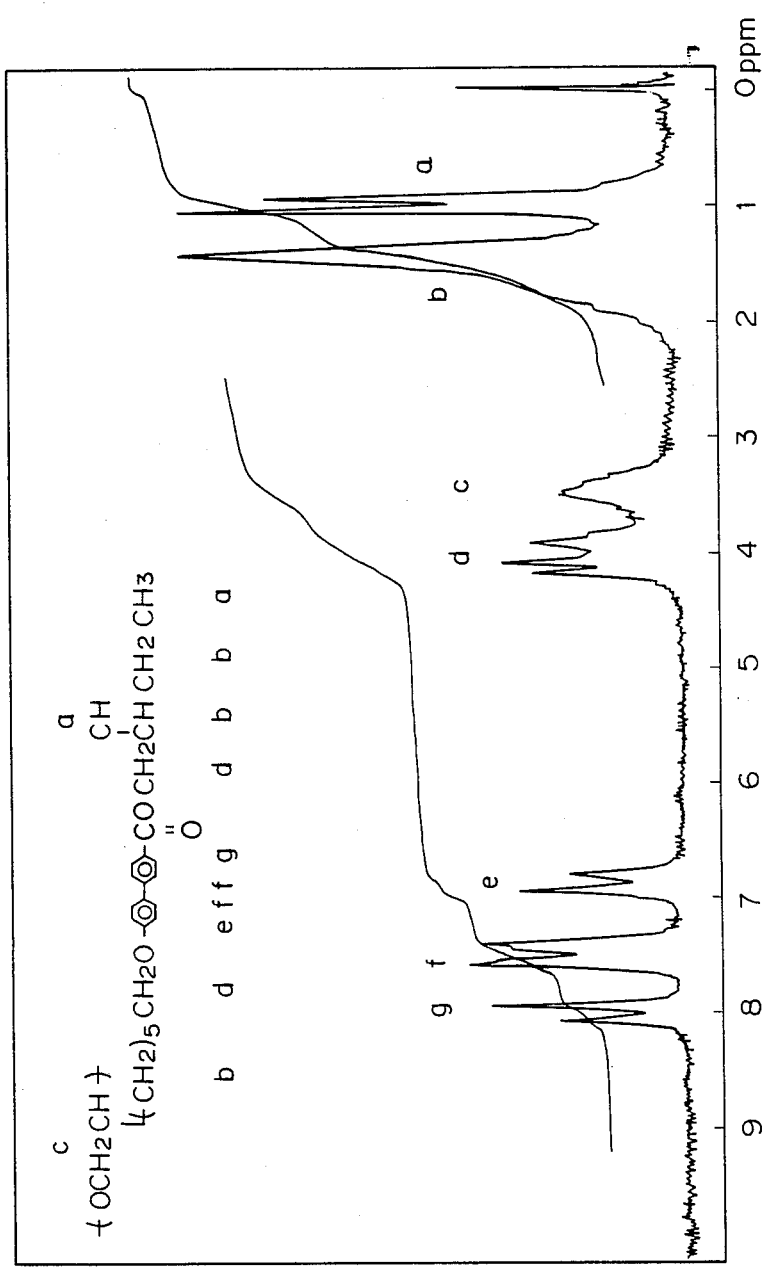
FIG. 17 is an $^1$H-NMR spectrum of the polymer obtained in Example 17.

The number average molecular weight, phase transition behavior, and electric field response speed of the obtained polymer are shown in Table 2, and the $^1$H-NMR spectrum is shown in FIG. 17.

EXAMPLE 18

The procedure of Example 4 was repeated with the exception that the amount of stannic chloride used in polymerization reaction was changed to 0.03 g, and 3.1 g of a polyoxirane (Mn=1,800) comprising the same repeating units as those of the polyoxirane obtained in Example 4 was obtained. (Yield: 55%).

Figure 18:
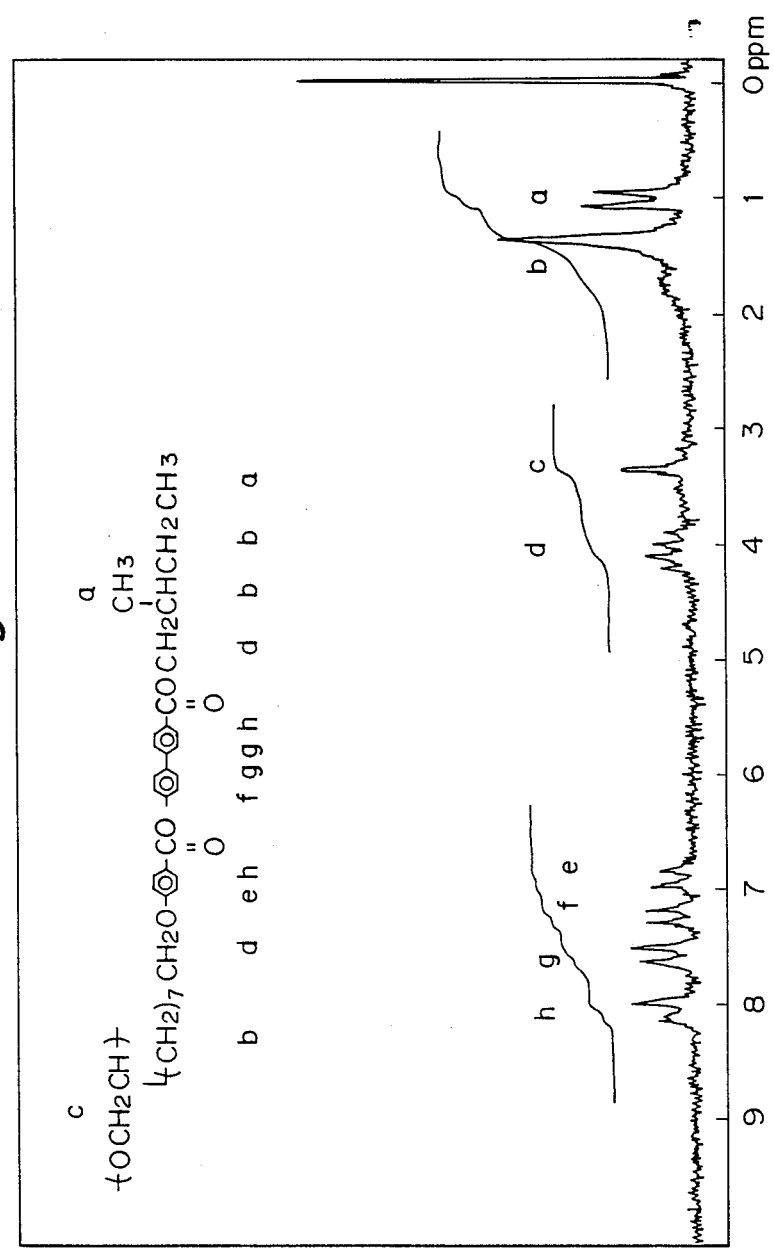
FIG. 18 is an $^1$H-NMR spectrum of the polymer obtained in Example 18.

The number average molecular weight, phase transition behavior, and electric field response speed of the obtained polymer are shown in Table 2, and the H-NMR spectrum is shown in FIG. 18.

EXAMPLE 19

The procedure of Example 1.(5) was repeated with the exception that 14.7 g of the same monomer as that obtained in Example 5.(3) was used and the amount of stannic chloride was changed to 0.55 g, and 7.3 g of a polyoxirane (Mn=1,600) comprising the same repeating units as those of the polyoxirane obtained in Example 5 was obtained. (Yield: 50%).

Figure 19:
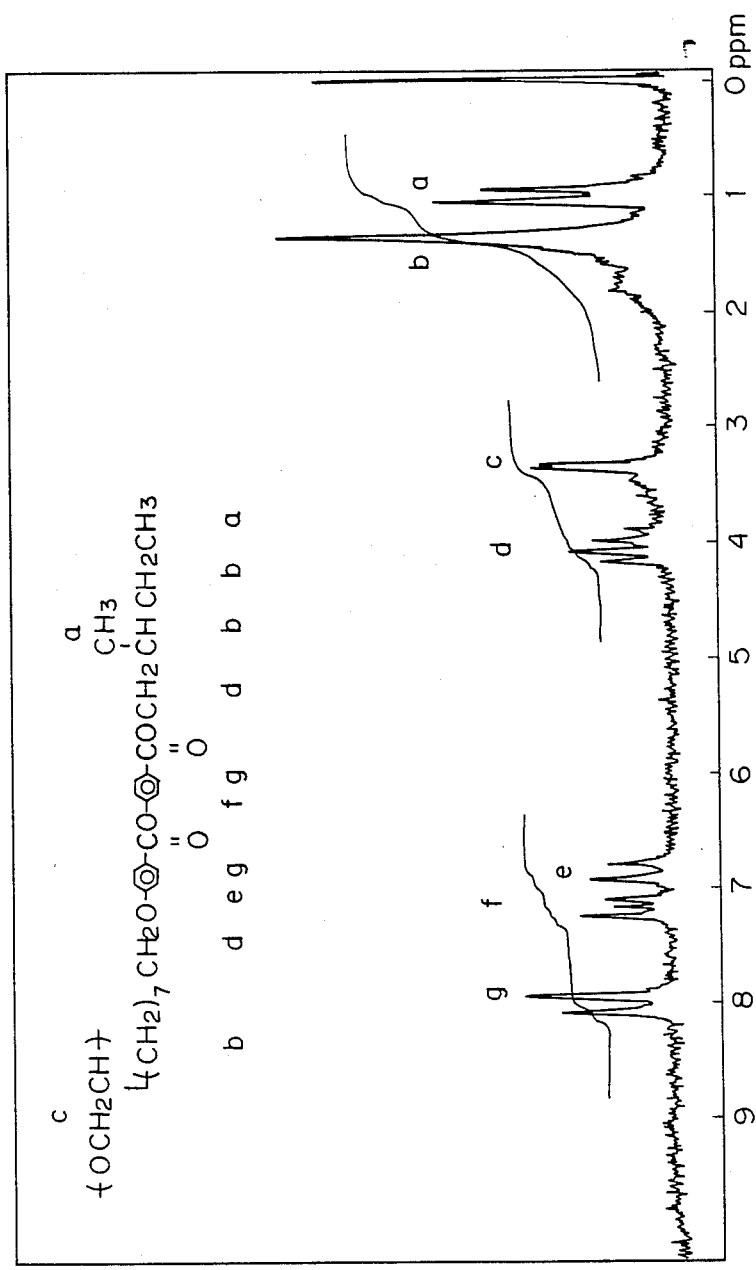
FIG. 19 is an $^1$H-NMR spectrum of the polymer obtained in Example 19.

The number average molecular weight, phase transition behavior, and electric field response speed of the obtained polymer are shown in Table 2, and the $^1$H-NMR spectrum is shown in FIG. 19.

EXAMPLE 20

20.(1) Synthesis of 1-methylpropyl p-hydroxybenzoate 25 g of p-acetoxybenzoic acid was suspènded in toluene, and the suspension was cooled with ice. To the suspension was dropped 22 g of thionyl chloride. The mixture was reacted for 4 hours at 80° C. After the reaction, the resulting reaction solution was concentrated under reduced pressure to obtain an acid chloride compound. 8.0 g of (+)-2-butanol and 12 g of pyridine were dissolved in toluene, and the solution was cooled with ice. To the solution was dropped a toluene solution of the above-obtained acid chloride compound. The mixture was reacted for 8 hours at 50° C. After the reaction, the resulting reaction solution was washed with water, dried, and concentrated under reduced pressure. The resulting residue was dissolved in ether, and the solution was cooled with ice. To the solution was added 9.5 g of benzylamine and the mixture was stirred for 2 hours at room temperature. After the reaction, the resulting reaction solution was washed with water, dried, and concentrated under reduced pressure. The resulting residue was pruified by column chromatography to obtain 14.2 g of the same ester compound as that obtained in Example 6.(1). (Yield: 68%).

20.(2) Synthesis of 1-methylpropyl 4-[4'-(9-decenyloxy)-benzoyloxy]benzoate

To 13.5 g of p-(9-decenyloxy)benzoic acid prepared by the procedure of Example 4.(1) was added toluene, and the mixture was cooled with ice. To the mixture was dropped 9 g of thionyl chloride. Reaction was then carried out for 7 hours at 80° C. After the reaction, the reaction solution was concentrated to obtain an acid chloride compound. 10 g of 1-methylpropyl 4-hydroxybenzoate obtained in 20.(1) and 4 g of pyridine were dissolved in toluene, and the resulting solution was cooled with ice. To the solution was dropped a toluene solution of the above-obtained acid chloride compound. Subsequently, reaction was carried out for 5 hours at 50° C. After the reaction, the resulting reaction solution was washed with water and dried over magnesium sulfate, and the solvent was then distilled out under reduced pressure. The resulting residue was purified by column chromatography to obtain 14.4 g of the same ester compound as that obtained in Example 6.(2). (Yield: 65%).

20.(3) Conversion to oxirane

The procedure of Example 1.(4) was repeated using 14.4 g of the ester compound obtained in 20.(2) to obtain 13.4 g of a monomer having the same structure as that of the monomer obtained in Example 6.(3). (Yield: 90%).

20.(4) Polymerization

The procedure of Example 1.(5) was repeated with the exception that 13.4 g of the monomer obtained in 20.(3) was used and the amount of stannic chloride was changed to 0.50 g, to obtain 7.5 g of a polyoxirane (Mn=1,700) comprising the same repeating units as those of the polyoxirane obtained in Example 6. (Yield: 56%).

Figure 20:
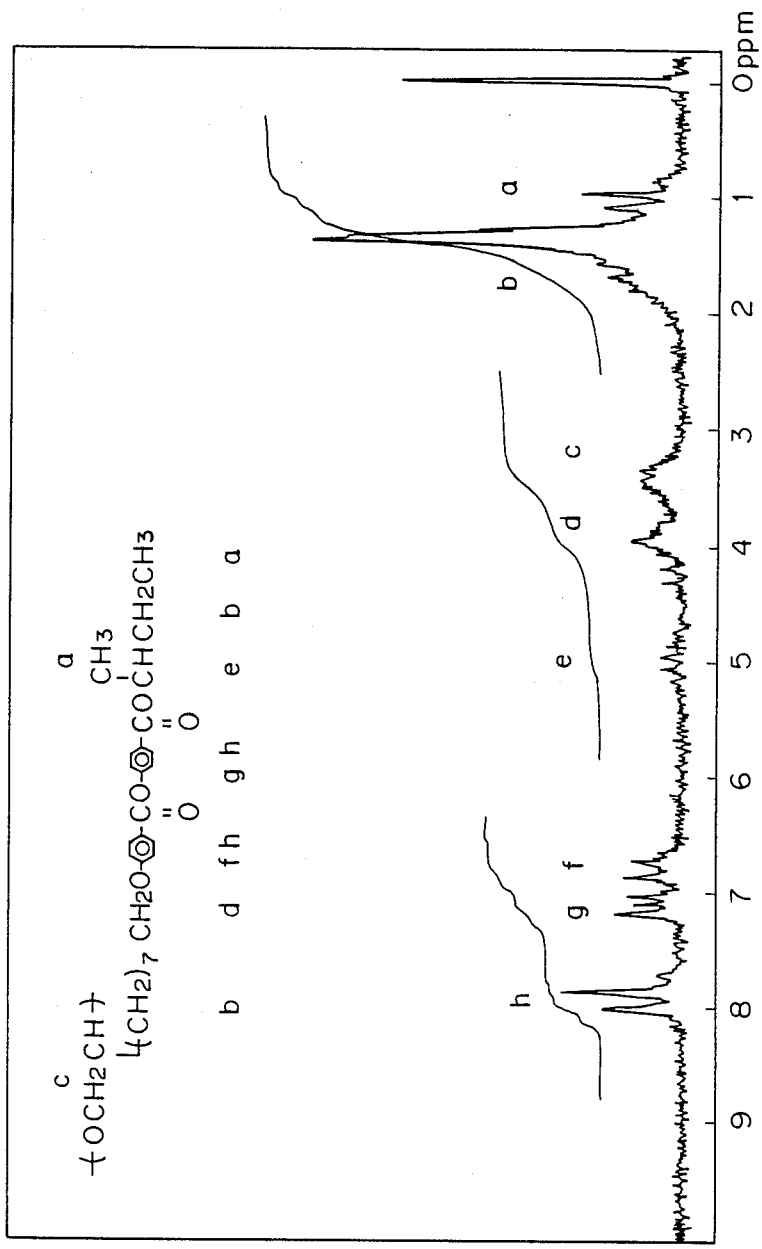
FIG. 20 is an $^1$H-NMR spectrum of the polymer obtained in Example 20.

The number average molecular weight, phase transition behavior, and electric field response speed of the obtained polymer are shown in Table 2, and the $^1$H-NMR spectrum is shown in FIG. 20.

EXAMPLE 21

The procedure of Example 1.(5) was repeated with the exception that 7.8 g of a monomer prepared by the procedure of Example 7.(3) was used and the amount of stannic chloride was changed to 0.30 g, and 4.7 g of a polyoxirane (Mn=1,600) comprising the same repeating units as those of the polyoxirane obtained in Example 7 was obtained. (Yield: 60%).

Figure 21:
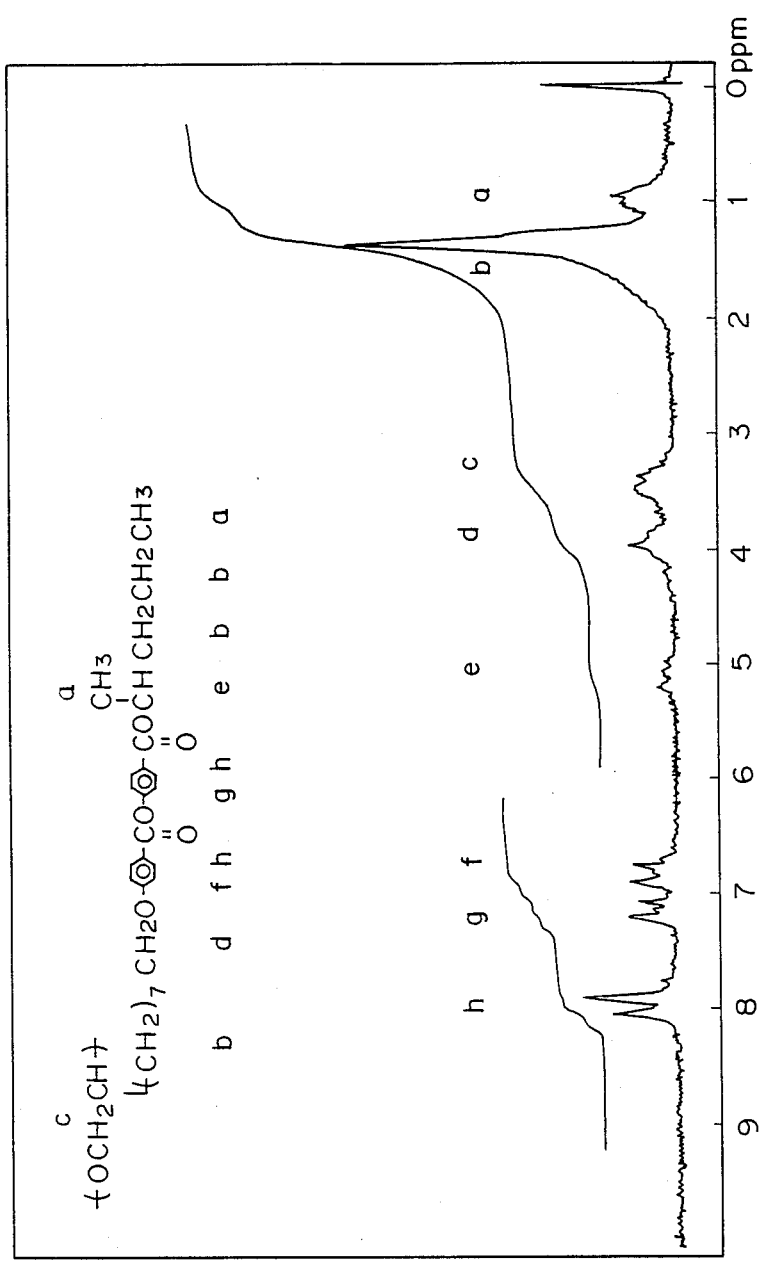
FIG. 21 is an $^1$H-NMR spectrum of the polymer obtained in Example 21.

The number average molecular weight, phase transition behavior, and electric field response speed of the obtained polymer are shown in Table 2, and the $^1$H-NMR spectrum is shown in FIG. 21.

EXAMPLE 22

The procedure of Example 1.(5) was repeated with the exception that 9.7 g of a monomer prepared by the procedure of Example 8.(3) was used and the amount of stannic chloride was changed to 0.33 g, and 6.8 g of a polyoxirane (Mn=1,750) comprising the same repeating units as those of the polyoxirane obtained in Example 8 was obtained. (Yield: 70%).

Figure 22:
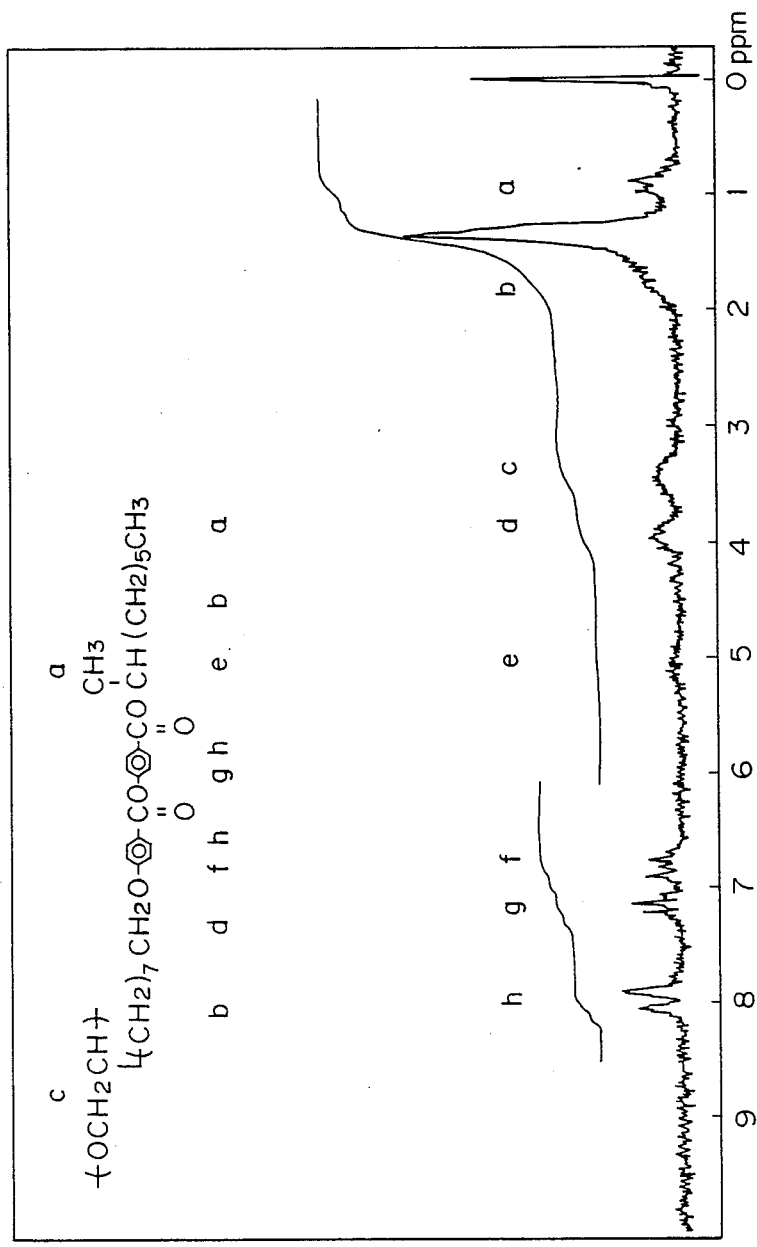
FIG. 22 is an $^1$H-NMR spectrum of the polymer obtained in Example 22.

The number average molecular weight, phase transition behavior, and electric field response speed of the obtained polymer are shown in Table 2, and the $^1$H-NMR spectrum is shown in FIG. 22.

EXAMPLE 23

The procedure of Example 1.(5) was repeated with the exception that 5.2 g of a monomer prepared by the procedure of Example 9.(2) was used and the amount of stannic chloride was changed to 0.18 g, and 3.6 g of a polyoxirane (Mn=1,570) comprising the same repeating units as those of the polyoxirane obtained in Example 9 was obtained. (Yield: 70%).

Figure 23:
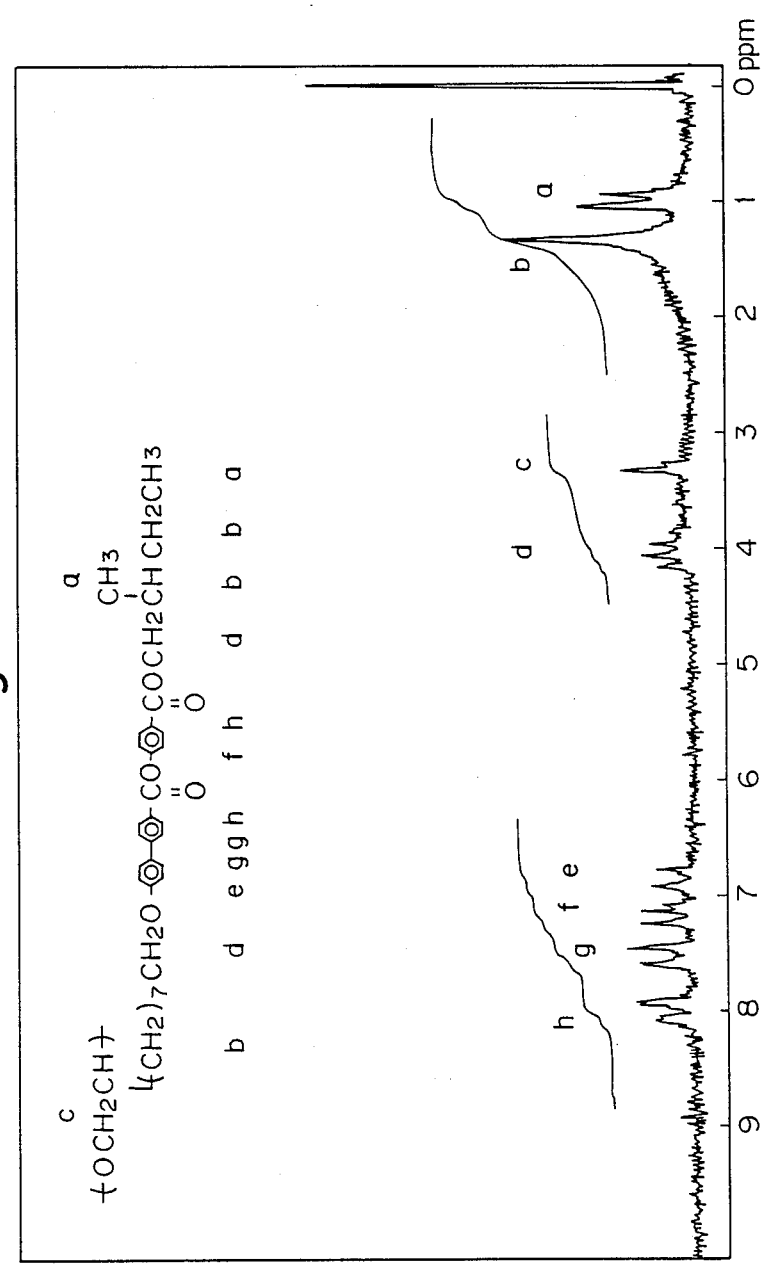
FIG. 23 is an $^1$H-NMR spectrum of the polymer obtained in Example 23.

The number average molecular weight, phase transition behavior, and electric field response speed of the obtained polymer are shown in Table 2, and the $^1$H-NMR spectrum is shown in FIG. 23.

EXAMPLE 24

The procedure of Example 1.(5) was repeated with the exception that 2.7 g of a monomer prepared by the procedure of Example 10.(3) was used and the amount of stannic chloride was changed to 0.09 g, and 2.1 g of a polyoxirane (Mn=1,960) comprising the same repeating units as those of the polyoxirane obtained in Example 10 was obtained. (Yield: 78%).

Figure 24:
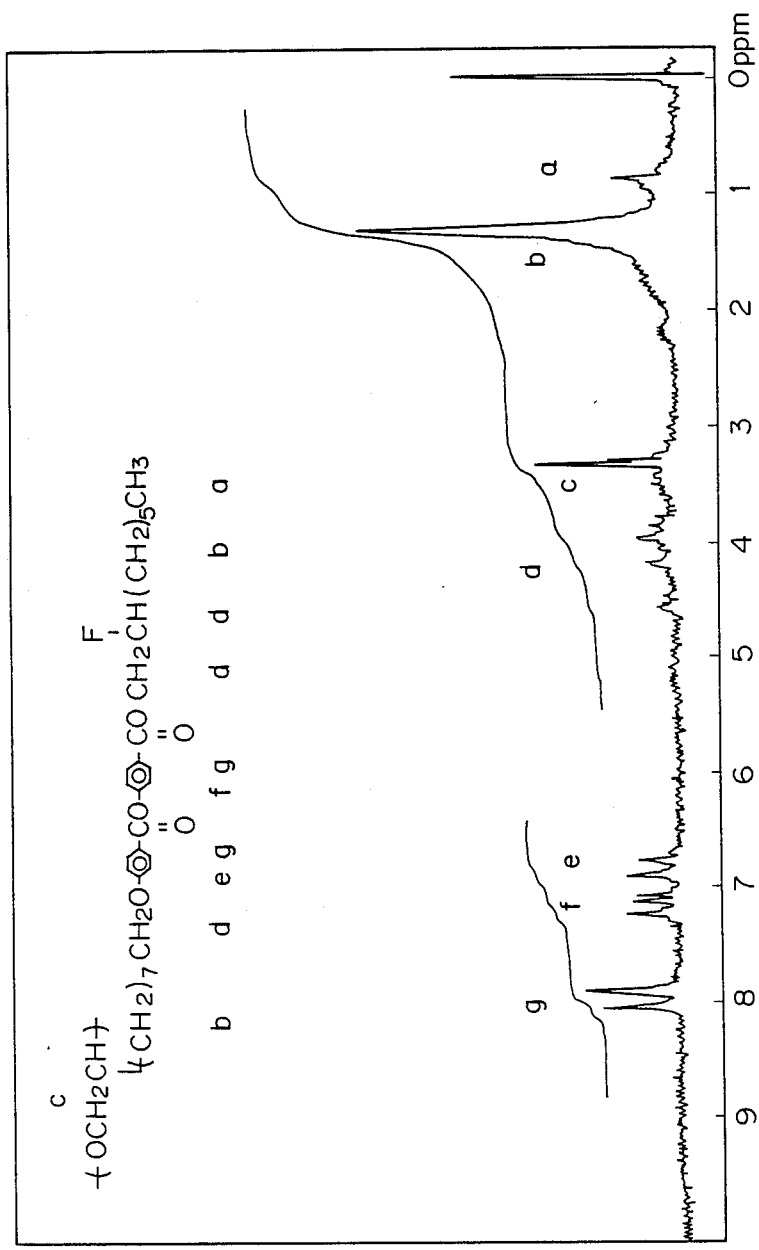
FIG. 24 is an $^1$H-NMR spectrum of the polymer obtained in Example 24.

The number average molecular weight, phase transition behavior, and electric field response speed of the obtained polymer are shown in Table 2, and the $^1$H-NMR spectrum is shown in FIG. 24.

EXAMPLE 25

The procedure of Example 1.(5) was repeated with the exception that 2.0 g of a monomer prepared by the procedure of Example 11.(2) was used and the amount of stannic chloride was changed to 0.10 g, and 1.0 g of a polyoxirane (Mn=1,700) comprising the same repeating units as those of the polyoxirane obtained in Example 11 was obtained. (Yield: 50%).

Figure 25:
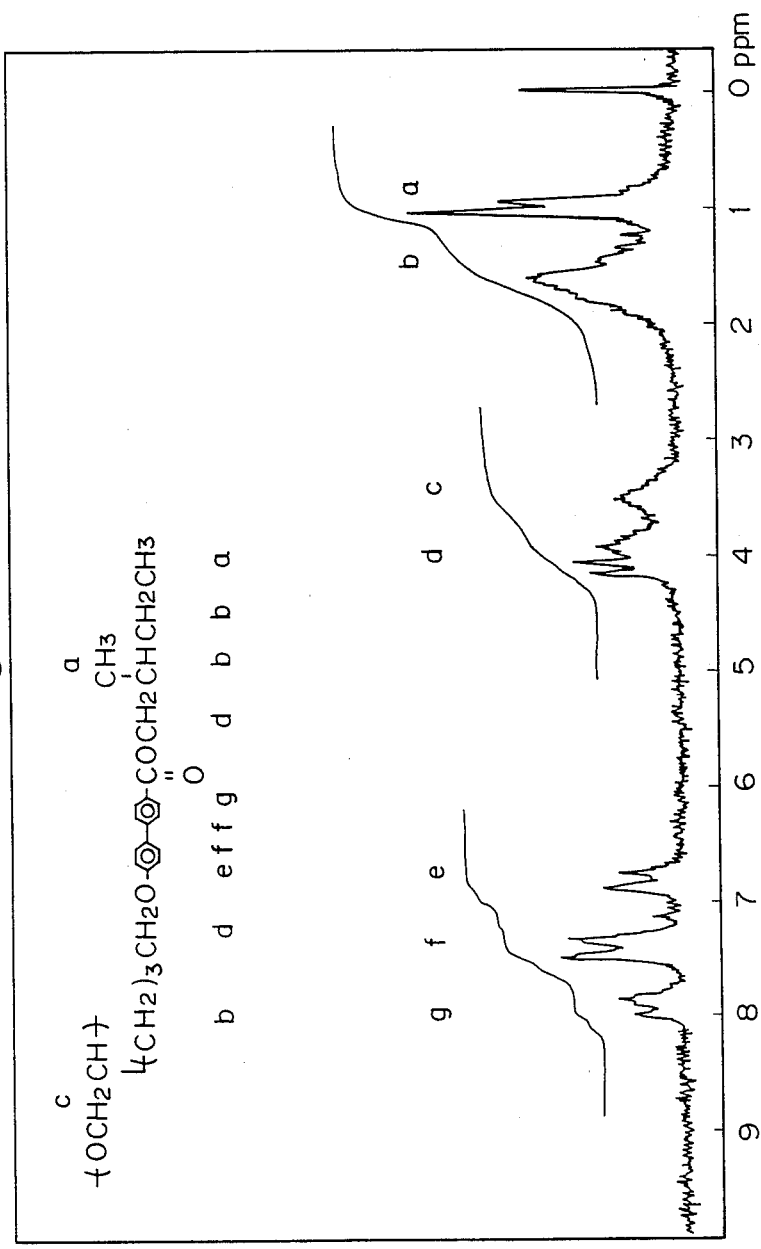
FIG. 25 is an $^1$H-NMR spectrum of the polymer obtained in Example 25.

The number average molecular weigth, phase transition behavior, and electric field response speed of the obtained polymer are shown in Table 2, and the $^1$H-NMR spectrum is shown in FIG. 25.

EXAMPLE 26

26.(1) Synthesis of 2-methylbutyl 4-[p-(7-octenyloxy)-benzoyloxy]biphenyl-4-carboxylate 1.8 g of p-(7-octenyloxy)benzoic acid obtained in Example 12.(1) was suspended in toluene, and the suspension was cooled with ice. To the suspension was dropped 1.3 g of thionyl chloride. After dropping thionyl chloride, temperature was raised to 80° C. and reaction was carried out for 3 hours. After the reaction, the resulting reaction solution was concentrated under reduced pressure to obtain an acid chloride compound. A toluene solution of the acid chloride compound was prepared by adding toluene thereto and cooled with ice.

To the above obtained toluene solution of acid chloride compound was dropped a toluene solution containing 2.0 g of 2-methylbutyl 4'-hydroxybiphenyl-4-carboxylate and 0.7 g of pyridine. Then the mixture was heated to 50° C. and reacted for 8 hours. After the reaction, the reaction solution was washed with water, dried over magnesium sulfate, and concentrated under reduced pressure. The residue was recrystallized from ethanol to obtain 2.5 g of the same ester compound as that obtained in Example 12.(2). (Yield: 69%).

26.(2) Conversion to oxirane

The procedure of Example 1.(4) was repeated using 2.5 g of the ester compound obtained in 26.(1) to obtain 2.4 of a monomer having the same structure as that of the monomer obtained in Example 12.(3). (Yield: 95%).

26.(3) Polymerization

The procedure of Example 1.(5) was repeated with the exception that 2.4 g of the monomer obtained in 26.(2) was used and the amount of stannic chloride was changed to 0.08 g to obtain 1.5 g of a polyoxirane (Mn=1,920) comprising the same repeating units as those of the polyoxirane obtained in Example 12. (Yield: 62%).

Figure 26:
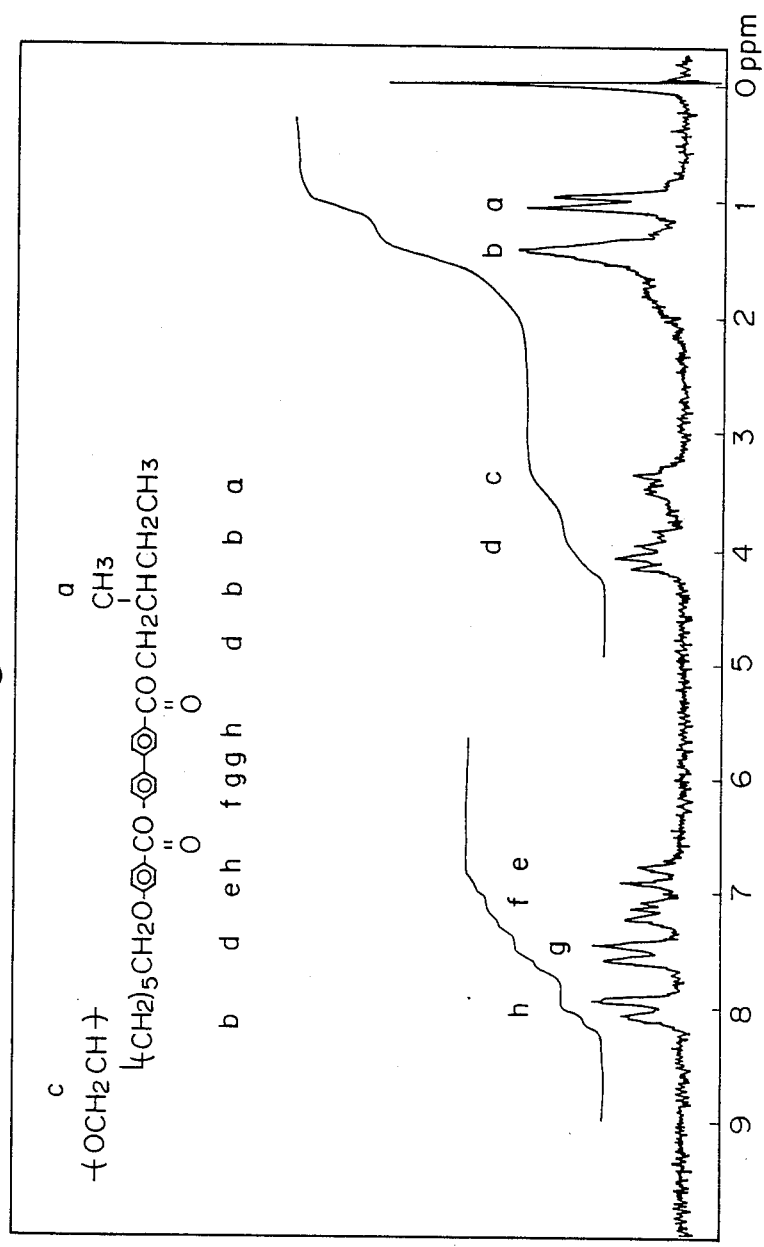
FIG. 26 is an $^1$H-NMR spectrum of the polymer obtained in Example 26.

The number average molecular weight, phase transition behavior, and electric field response speed of the obtained polymer are shown in Table 2, and the $^1$H-NMR spectrum is shown in FIG. 26.

EXAMPLE 27

The procedure of Example 1.(5) was repeated with the exception that 2.5 g of a monomer prepared by the procedure of Example 13.(3) was used and the amount of stannic chloride was changed to 0.09 g, and 2.1 g of a polyoxirane (Mn=1,300) comprising the same repeating units as those of the polyoxirane obtained in Example 13 was obtained. (Yield: 88%).

Figure 27:
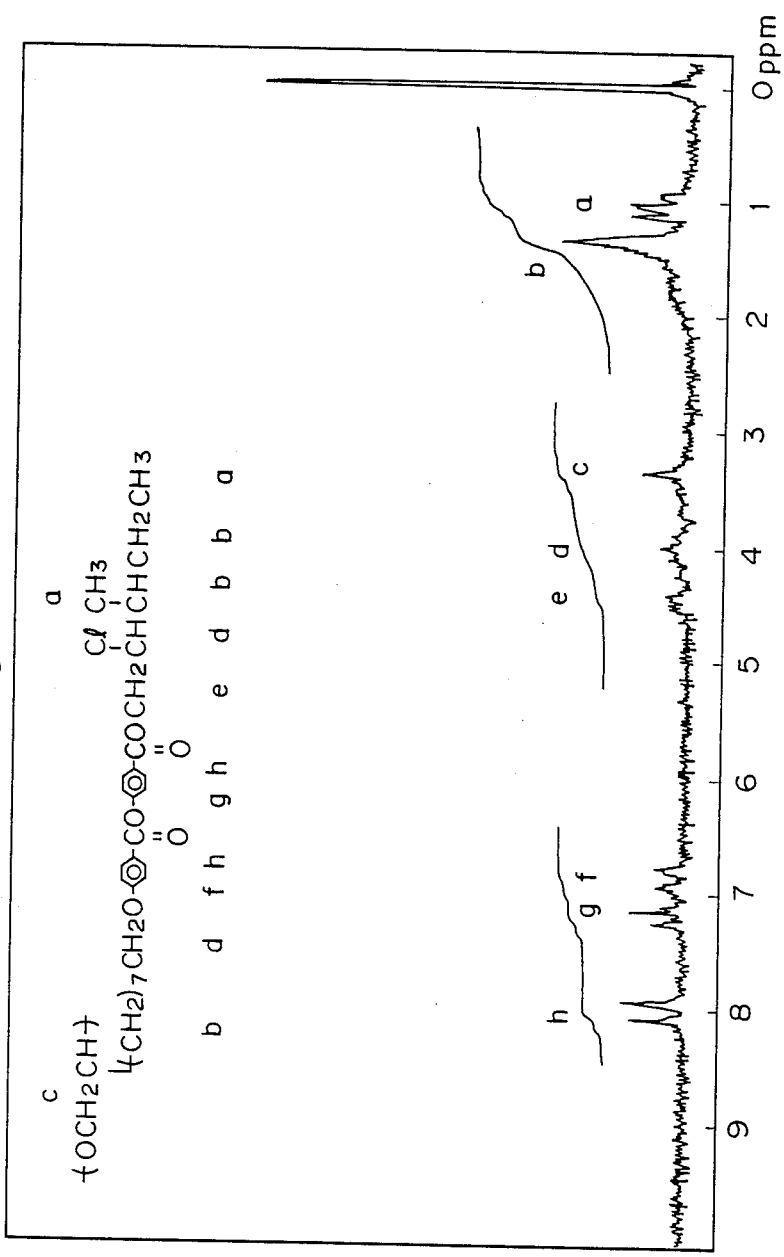
FIG. 27 is an $^1$H-NMR spectrum of the polymer obtained in Example 27.

The number average molecular weight, phase transition behavior, and electric field response speed of the obtained polymer are shown in Table 2, and the $^1$H-NMR spectrum is shown in FIG. 27.

EXAMPLE 28

The procedure of Example 1.(5) was repeated with the exception that 4.0 g of a monomer prepared by the procedure of Example 14.(2) was used and the amount of stannic chloride was changed to 0.14 g, and 3.2 g of a polyoxirane (Mn=1,570) comprising the same repeating units as those of the polyoxirane obtained in Example 14 was obtained. (Yield: 80%).

Figure 28:
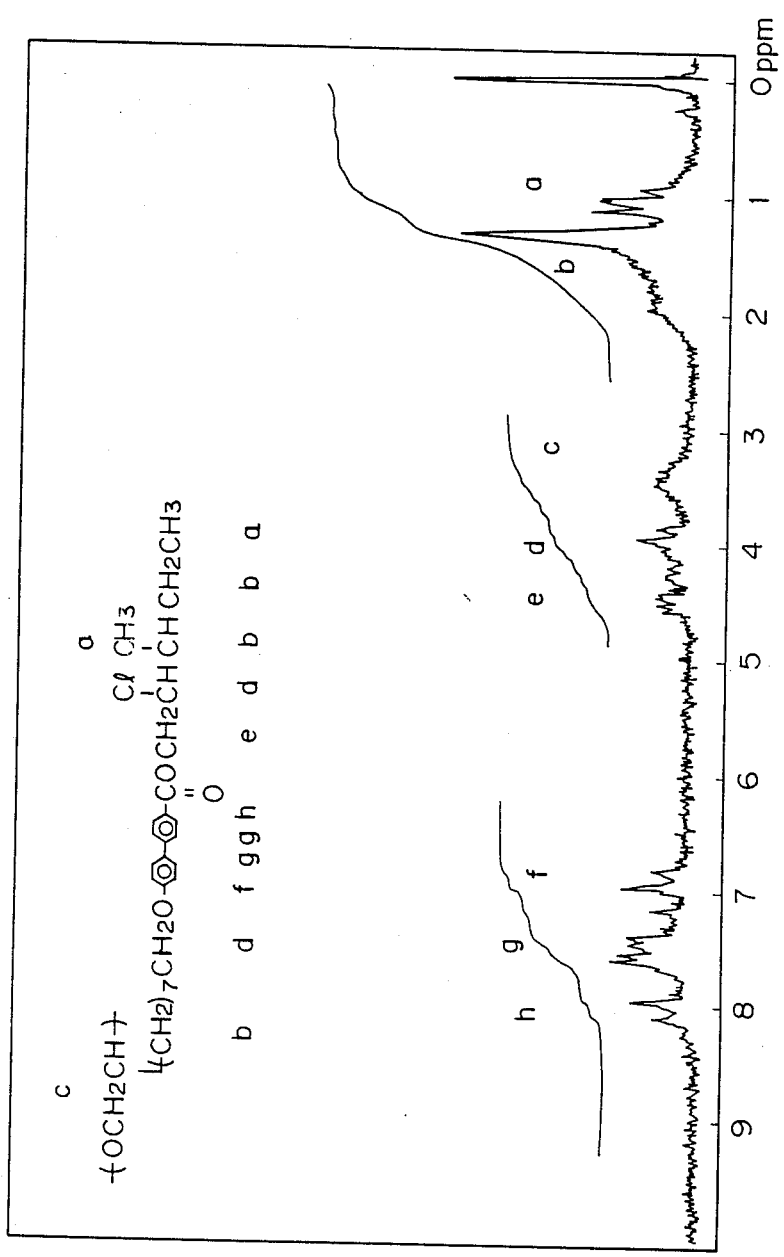
FIG. 28 is an $^1$H-NMR spectrum of the polymer obtained in Example 28.

The number average molecular weight, phase transition behavior, and electric field response speed of the obtained polymer are shown in Table 2, and the $^1$H-NMR spectrum is shown in FIG. 28.

TABLE 2

| Example No. | Repeating unit | Number average molecular weight | Phase transition temperature (°C) | Response time (sec.) | Measuring temp. (°C) |
|---|---|---|---|---|---|
| 15 | −(OCH$_2$CH(−(CH$_2$)$_8$O−⟨Ph⟩−⟨Ph⟩−COOCH$_2$*CH(CH$_3$)C$_2$H$_5$))− | 1,700 | glass $\underset{-21}{\overset{-15}{\rightleftarrows}}$ S$_1$ $\underset{20}{\overset{21}{\rightleftarrows}}$ SmC* $\underset{30}{\overset{36}{\rightleftarrows}}$ SmA $\underset{72}{\overset{78}{\rightleftarrows}}$ Iso | 0.01 | 25 |
| 16 | −(OCH$_2$CH(−(CH$_2$)$_{10}$O−⟨Ph⟩−⟨Ph⟩−COOCH$_2$*CH(CH$_3$)C$_2$H$_5$))− | 1,500 | S$_1$ $\underset{15}{\overset{23}{\rightleftarrows}}$ SmC* $\underset{33}{\overset{46}{\rightleftarrows}}$ SmA $\underset{87}{\overset{88}{\rightleftarrows}}$ Iso | 0.005 / 0.09 | 40 / 27 |
| 17 | −(OCH$_2$CH(−(CH$_2$)$_6$O−⟨Ph⟩−⟨Ph⟩−COOCH$_2$*CH(CH$_3$)C$_2$H$_5$))− | 1,600 | glass $\underset{-20}{\overset{-13}{\rightleftarrows}}$ S$_1$ $\underset{23}{\overset{23}{\rightleftarrows}}$ SmC* $\underset{26}{\overset{33}{\rightleftarrows}}$ SmA $\underset{65}{\overset{70}{\rightleftarrows}}$ Iso | 0.08 | 25 |
| 18 | −(OCH$_2$CH(−(CH$_2$)$_8$O−⟨Ph⟩−COO−⟨Ph⟩−⟨Ph⟩−COOCH$_2$*CH(CH$_3$)CH$_2$C$_2$H$_5$))− | 1,800 | S$_1$ $\underset{20}{\overset{20}{\rightleftarrows}}$ SmC* $\underset{117}{\overset{120}{\rightleftarrows}}$ SmA $\underset{145}{\overset{148}{\rightleftarrows}}$ N* $\underset{149}{\overset{151}{\rightleftarrows}}$ Iso | 0.001 | 100 |
| 19 | −(OCH$_2$CH(−(CH$_2$)$_8$O−⟨Ph⟩−COO−⟨Ph⟩−⟨Ph⟩−COOCH$_2$*CH(CH$_3$)C$_2$H$_5$))− | 1,600 | glass $\underset{-30}{\overset{-30}{\rightleftarrows}}$ S$_1$ $\underset{-1}{\overset{0}{\rightleftarrows}}$ SmC* $\underset{33}{\overset{34}{\rightleftarrows}}$ SmA $\underset{49}{\overset{51}{\rightleftarrows}}$ Iso | 0.01 | 30 |
| 20 | −(OCH$_2$CH(−(CH$_2$)$_8$O−⟨Ph⟩−COO−⟨Ph⟩−COOCH*(CH$_3$)C$_2$H$_5$))− | 1,700 | glass $\underset{-12}{\overset{-10}{\rightleftarrows}}$ SmC* $\underset{31}{\overset{32}{\rightleftarrows}}$ Iso | 0.002 | 25 |
| 21 | −(OCH$_2$CH(−(CH$_2$)$_8$O−⟨Ph⟩−COO−⟨Ph⟩−COOCH*(CH$_3$)(CH$_2$)$_2$CH$_3$))− | 1,600 | glass $\underset{-11}{\overset{-10}{\rightleftarrows}}$ SmC* $\underset{18}{\overset{20}{\rightleftarrows}}$ Iso | 0.006 | 15 |
| 22 | −(OCH$_2$CH(−(CH$_2$)$_8$O−⟨Ph⟩−COO−⟨Ph⟩−COOCH*(CH$_3$)(CH$_2$)$_5$CH$_3$))− | 1,750 | glass $\underset{-25}{\overset{-17}{\rightleftarrows}}$ SmC* $\underset{-9}{\overset{-5}{\rightleftarrows}}$ Iso | 0.1 | −12 |

TABLE 2-continued

| Example No. | Repeating unit | Number average molecular weight | Phase transition temperature (°C.) | Response time (sec.) | Measuring temp. (°C.) |
|---|---|---|---|---|---|
| 23 | –(OCH$_2$CH)– with side chain –(CH$_2$)$_8$O–[biphenyl]–COO–[phenyl]–COOCH$_2$CH(CH$_3$)CH$_2$CH$_5$* | 1,570 | S$_1$ $\xrightarrow{20}_{18}$ SmC* $\xrightarrow{106}_{98}$ SmA $\xrightarrow{155}_{153}$ N* $\xrightarrow{160}_{157}$ Iso | 0.01 | 95 |
| 24 | –(OCH$_2$CH)– with side chain –(CH$_2$)$_6$O–[biphenyl]–COO–[phenyl-F]–COOCH$_2$CH(CH$_2$)$_5$CH$_3$* | 1,960 | Cry $\xrightarrow{36}_{24}$ SmC* $\xrightarrow{45}_{45}$ N* $\xrightarrow{55}_{55}$ Iso | 0.002 / 0.001 | 35 / 40 |
| 25 | –(OCH$_2$CH)– with side chain –(CH$_2$)$_4$O–[biphenyl]–COO–[phenyl]–COOCH$_2$CHC$_2$H$_5$* with CH$_3$ | 1,700 | glass $\xrightarrow{0}_{-5}$ S$_1$ $\xrightarrow{17}_{15}$ SmC* $\xrightarrow{27}_{22}$ SmA $\xrightarrow{65}_{62}$ Iso | 0.006 | 20 |
| 26 | –(OCH$_2$CH)– with side chain –(CH$_2$)$_8$O–[biphenyl]–COO–[phenyl]–COOCH$_2$CHC$_2$H$_5$* with CH$_3$ | 1,920 | S$_1$ $\xrightarrow{28}_{25}$ SmC* $\xrightarrow{120}_{117}$ N $\xrightarrow{149}_{149}$ N* $\xrightarrow{153}_{150}$ Iso | 0.01 / 0.04 | 110 / 60 |
| 27 | –(OCH$_2$CH)– with side chain –(CH$_2$)$_8$O–[biphenyl]–COO–[phenyl-Cl]–COOCH$_2$CH–CHCH$_2$CH$_5$* with CH$_3$ | 1,300 | Cry $\xrightarrow{38}$ Iso; $\xrightarrow{34}$ ; SmC* $\xrightarrow{-20}$ | 0.002 | 30 |
| 28 | –(OCH$_2$CH)– with side chain –(CH$_2$)$_8$O–[biphenyl]–COO–[phenyl]–COOCH$_2$CH–CHCH$_2$CH$_5$* with Cl, CH$_3$ | 1,570 | Cry $\xrightarrow{10}_{10}$ SmC* $\xrightarrow{60}_{60}$ SmA $\xrightarrow{100}_{80}$ Iso | 0.002 | 40 |

What is claimed is;

1. A ferroelectric liquid-crystalline polymer comprising the repeating units of the general formula (I)

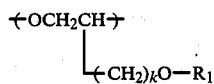  (I)

in which:
k is an interger from 1 to 30; and

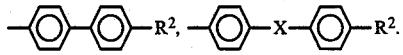

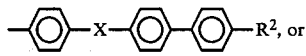

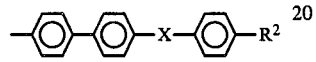

where:
X is —COO— or —OCO—; and
$R^2$ is —COOR$^3$, or —OR$^3$
where:
$R^3$ is

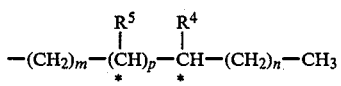

$R^4$ and $R^5$ being each independently —CH$_3$, a halogen radical, or —CN, m and n being each independently an integer from 0 to 10 with the proviso that n is not 0 when $R^4$ is —CH$_3$, p being 0 or 1, and C marked with being an asymmetric carbon atom.

2. The ferroelectric liquid-crystalline polymer of claim 1 wherein the number average molecular weight of the liquid-crystalline polymer is from 2,000 to 400,000.

3. The ferroelectric liquid-crystalline polymer of claim 1 wherein the number average molecular weight of the liquid-crystalline polymer is less than 2,000 and not less than 1,000.

4. The ferroelectric liquid-crystalline polymer of claims 2 or 3 wherein k is an integer from 4 to 10.

5. The ferroelectric liquid-crystalline polymer of claims 2 or 3 wherein $R^1$ is selected from the group consisting of

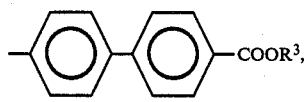

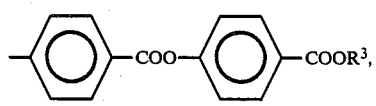

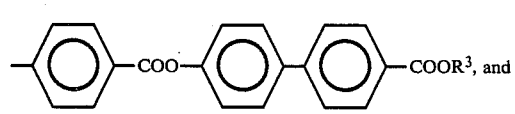

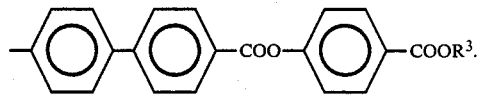

6. The ferroelectric liquid-crystalline polymer of claims 2 or 3 wherein $R^3$ is selected from the group consisting of

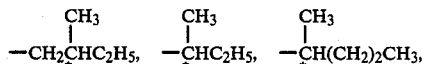

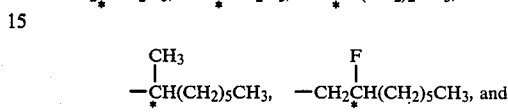

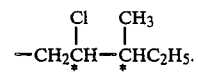

7. The ferroelectric liquid-crystalline polymer of claim 1, wherein k is an integre of from 4 to 10.

8. The ferroelectric liquid-crystalline polymer of claim 1 wherein $R^1$ is selected from the group consisting of

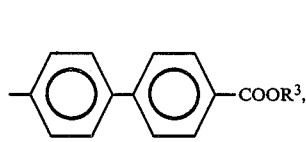

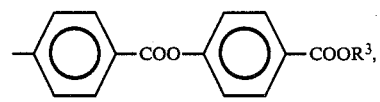

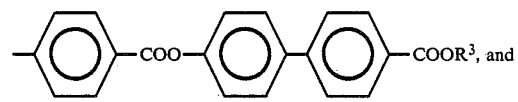

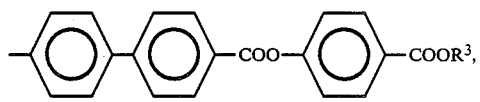

and $R^3$ is selected from the group consisting of

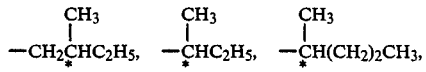

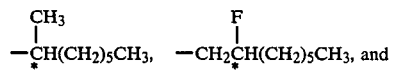

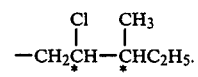

9. The ferroelectric liquid-crystalline polymer of claim 2 or claim 3 wherein $R^1$ is selected from the group consisting of

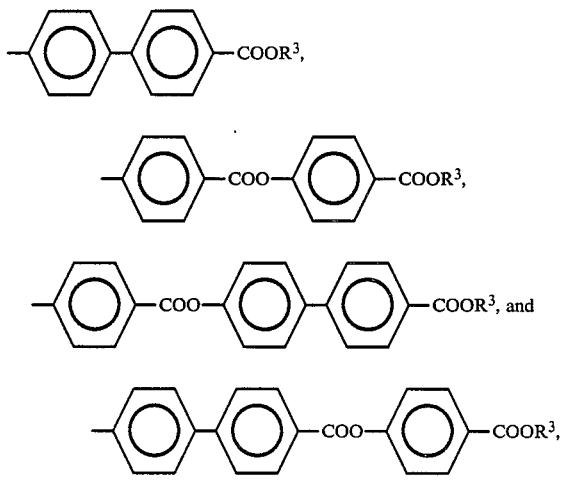

and R³ is selected from the group consisting of

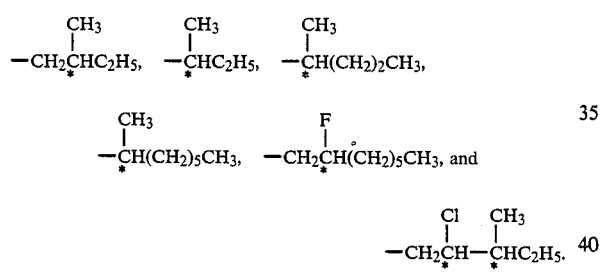

10. The ferroelectric liquid-crystalline polymer of claim 1 comprising the repeating units of the following formula

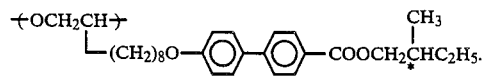

11. The ferroelectric liquid-crystalline polymer of claim 1 comprising the repeating units of the following formula

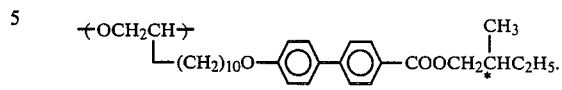

12. The ferroelectric liquid-crystalline polymer of claim 1 comprising the repeating units of the following formula

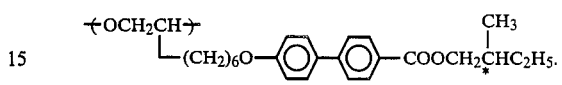

13. The ferroelectric liquid-crystalline polymer of claim 1 comprising the repeating units of the following formula

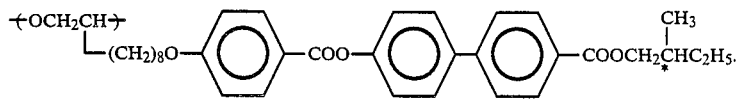

14. The ferroelectric liquid-crystalline polymer of claim 1 comprising the repeating units of the following formula

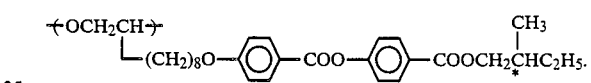

15. The ferroelectric liquid-crystalline polymer of claim 1 comprising the repeating units of the following formula

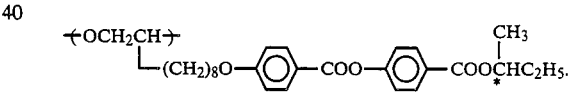

16. The ferroelectric liquid-crystalline polymer of claim 1 comprising the repeating units of the following formula

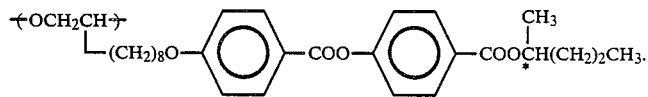

17. The ferroelectric liquid-crystalline polymer of claim 1 comprising the repeating units of the following formula

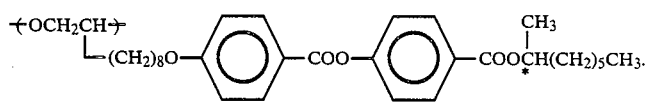

18. The ferroelectric liquid-crystalline polymer of claim 1 comprising the repeating units of the following formula

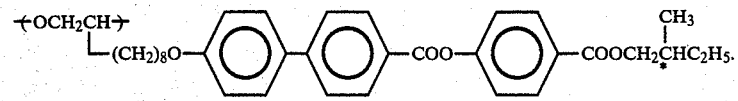

19. The ferroelectric liquid-crystalline polymer of claim 1 comprising the repeating units of the following formula

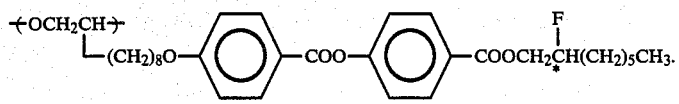

20. The ferroelectric liquid-crystalline polymer of claim 1 comprising the repeating units of the following formula

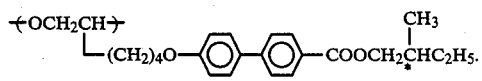

21. the ferroelectric liquid-crystalline polymer of claim 1 comprising the repeating units of the following formula

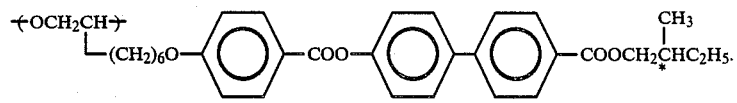

22. The ferroelectric liquid-crystalline polymer of claim 1 comprising the repeating units of the following formula

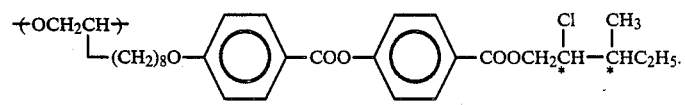

23. The ferroelectric liquid-crystalline polymer of claim 1 comprising the repeating units of the following formula

* * * * *